US012794956B2

(12) United States Patent
Kumar

(10) Patent No.: US 12,794,956 B2
(45) Date of Patent: Nov. 10, 2026

(54) AUTOMATIC MULTI-USER INPUT MERGE RESOLUTION FOR A DOCUMENT COLLABORATION PLATFORM USING INPUT STEP EVENTS AND MACHINE-LEARNING-BASED PROCESSING TECHNIQUES

(71) Applicants: ATLASSIAN PTY LTD., Sydney (AU); ATLASSIAN US, INC., San Francisco, CA (US)

(72) Inventor: Navneet Kumar, Sydney (AU)

(73) Assignees: Atlassian Pty, Ltd., Sydney (AU); Atlassian US, Inc., San Francisco, CA (US)

( * ) Notice: Subject to any disclaimer, the term of this patent is extended or adjusted under 35 U.S.C. 154(b) by 0 days.

(21) Appl. No.: 18/147,827

(22) Filed: Dec. 29, 2022

(65) Prior Publication Data

US 2024/0223627 A1 Jul. 4, 2024

(51) Int. Cl.
*H04L 65/401* (2022.01)
*G06F 40/117* (2020.01)
*H04L 67/306* (2022.01)

(52) U.S. Cl.
CPC ........ *H04L 65/4015* (2013.01); *G06F 40/117* (2020.01); *H04L 67/306* (2013.01)

(58) Field of Classification Search
None
See application file for complete search history.

(56) References Cited

U.S. PATENT DOCUMENTS

| | | | | |
|---|---|---|---|---|
| 10,086,288 | B1 * | 10/2018 | Surjo-Subagio | H04L 67/141 |
| 2006/0020570 | A1 * | 1/2006 | Wu | G06F 16/2336 |
| 2013/0151940 | A1 * | 6/2013 | Bailor | G06F 40/169 715/229 |
| 2013/0185252 | A1 * | 7/2013 | Palmucci | G06F 16/93 707/608 |
| 2013/0262373 | A1 * | 10/2013 | Rampson | G06F 40/197 707/E17.008 |
| 2013/0311986 | A1 * | 11/2013 | Arrouye | H04L 67/1097 717/175 |

(Continued)

*Primary Examiner* — Chris Parry
*Assistant Examiner* — Abderrahmen Chouat
(74) *Attorney, Agent, or Firm* — Alston & Bird LLP

(57) ABSTRACT

Techniques for automatically resolving document conflicts for multiple client computing devices associated with multiple respective user profiles are discussed herein. Embodiments are configured to receive multi-user input data associated with a collaborative document, where the multi-user input data is generated by two or more client computing devices associated with two or more user profiles supported by a document collaboration platform. Embodiments can generate user input step events based on the multi-user input data, where each of the user input step events are associated with a respective user profile. Embodiments can determine one or more document conflicts associated with the collaborative document based on application of a document merge model to the document object. The document merge model generates document merge resolutions associated with a respective merge resolution confidence score and determines whether to automatically incorporate the document merge resolutions into the collaborative document based on the merge resolution confidence scores.

20 Claims, 12 Drawing Sheets

500

(56) References Cited

U.S. PATENT DOCUMENTS

| | | | | |
|---|---|---|---|---|
| 2015/0106790 | A1* | 4/2015 | Bigwood | G06F 11/3624 717/127 |
| 2016/0357790 | A1* | 12/2016 | Elkington | G06F 16/215 |
| 2018/0011825 | A1* | 1/2018 | Levien | G06F 16/93 |
| 2020/0012738 | A1* | 1/2020 | Tung | G06F 16/9024 |
| 2022/0365982 | A1* | 11/2022 | Ashlock | H04L 12/1827 |
| 2023/0195454 | A1* | 6/2023 | Guarnieri | G05B 19/042 717/102 |
| 2023/0281005 | A1* | 9/2023 | Groenewegen | G06F 11/3688 717/120 |
| 2024/0005086 | A1* | 1/2024 | Zheng | G06F 16/176 |

* cited by examiner

AUTOMATIC MULTI-USER INPUT MERGE RESOLUTION FOR A DOCUMENT COLLABORATION PLATFORM USING INPUT STEP EVENTS AND MACHINE-LEARNING-BASED PROCESSING TECHNIQUES

TECHNICAL FIELD

Embodiments of the present disclosure are generally directed to automatically resolving conflicts for a collaborative document in a document collaboration platform.

BACKGROUND

Various methods, apparatuses, and systems are configured to provide techniques for automatically resolving conflicts for a collaborative document. Applicant has identified many deficiencies and problems associated with existing methods, apparatuses, and systems for automatically resolving conflicts for a collaborative document. Through applied effort, ingenuity, and innovation, these identified deficiencies and problems have been solved by developing solutions that are in accordance with the embodiments of the present invention, many examples of which are described in detail herein.

BRIEF SUMMARY

In one aspect, an apparatus for automatically resolving document conflicts in a collaborative document includes a display, at least one processor, and at least one memory including program code. The at least one memory and the program code are configured to, with the at least one processor, cause the apparatus to receive multi-user input data associated with the collaborative document. The multi-user input data is generated by two or more client computing devices associated with two or more user profiles supported by a document collaboration platform. The apparatus also includes program code configured to generate, via the document collaboration platform, one or more user input step events based on the multi-user input data, where each of the one or more user input step events are associated with a respective user profile of the two or more user profiles. The apparatus also includes program code configured to generate, based on the one or more user input step events, a document object representative of the collaborative document. The apparatus also includes program code configured to determine one or more document conflicts associated with the collaborative document based on application of a document merge model to the document object. The apparatus also includes program code configured to generate, based on the one or more document conflicts, one or more document merge resolutions, where the one or more document merge resolutions are associated with a respective merge resolution confidence score. The apparatus also includes program code configured to, in response to a determination that a merge resolution confidence score associated with a selected document merge resolution of the one or more document merge resolutions satisfies a predefined document merge resolution threshold, update the collaborative document to incorporate the selected document merge resolution.

The apparatus further includes where, in response to a determination that a merge resolution confidence score associated with the selected document merge resolution of the one or more document merge resolutions does not satisfy the predefined document merge resolution threshold, program code to generate a suggested document merge resolution recommendation based on the selected document merge resolution. The apparatus also includes program code configured to display the suggested document merge resolution recommendation on an interactive user interface associated with a client computing device related to a dominant user, where the dominant user is associated with a user profile of the two or more user profiles, and where the dominant user is determined by the document merge model.

The apparatus further includes program code configured to receive a confirmation signal associated with the suggested document merge resolution recommendation, where the confirmation signal is generated by the client computing device associated with the dominant user, and where the confirmation signal comprises an acceptance of the suggested document merge resolution recommendation or a rejection of the suggested document merge resolution recommendation. The apparatus also includes program code configured to, in response to receiving a confirmation signal comprising the acceptance of the suggested document merge resolution recommendation, update the collaborative document to incorporate the suggested document merge resolution recommendation. The apparatus also includes program code configured to store the updated collaborative document in a document collaboration data repository associated with the document collaboration platform. The apparatus also includes program code configured to retrain the document merge model based on the confirmation signal comprising the acceptance of the suggested document merge resolution recommendation.

The apparatus further includes program code configured to generate a document merge resolution associated with a second user profile passage associated with a second user profile, where the document merge resolution associated with the second user profile passage is generated based on a document conflict associated with a first user profile passage associated with a first user profile identifier.

The apparatus further includes program code configured to generate a document merge resolution comprising a third user profile passage based on a document conflict associated with a first user profile passage associated with a first user profile and a second user profile passage associated with a second user profile.

The apparatus further includes program code configured to generate sequenced textual content based on the one or more user input step events, where the sequenced textual content can be associated with the two or more user profiles. The apparatus also includes program code configured to render, on one or more interactive user interfaces associated with the collaborative document, the sequenced textual content.

The apparatus further includes where the one or more document conflicts comprise at least one of a duplicate textual content conflict, a duplicate subject matter conflict, a document item sequencing conflict, or a document markup conflict.

The apparatus further includes where the one or more document merge resolutions comprise at least one of a textual content deletion resolution, a textual content merging resolution, a document item resequencing resolution, or a textual content markup resolution.

The apparatus further includes where the document merge model can be trained based in part on one or more collaborative documents stored in a data repository of a particular document collaboration platform, and where the one or more collaborative documents comprise one or more user profile passages associated with one or more respective user profiles associated with the particular document collaboration platform.

In one aspect, a computer-implemented method for automatically generating adaptive digital content for a collaborative document includes receiving multi-user input data associated with the collaborative document, where the multi-user input data is generated by two or more client computing devices associated with two or more user profiles supported by a document collaboration platform. The computer-implemented method also includes generating, via the document collaboration platform, one or more user input step events based on the multi-user input data, where each of the one or more user input step events are associated with a respective user profile of the two or more user profiles. The computer-implemented method also includes generating, based on the one or more user input step events, a document object representative of the collaborative document. The computer-implemented method also includes determining one or more document conflicts associated with the collaborative document based on application of a document merge model to the document object. The computer-implemented method also includes generating, based on the one or more document conflicts, one or more document merge resolutions, where the one or more document merge resolutions are associated with a respective merge resolution confidence score. The computer-implemented method also includes, in response to a determination that a merge resolution confidence score associated with a selected document merge resolution of the one or more document merge resolutions satisfies a predefined document merge resolution threshold, updating the collaborative document to incorporate the selected document merge resolution.

The computer-implemented method further includes, in response to a determination that a merge resolution confidence score associated with the selected document merge resolution of the one or more document merge resolutions does not satisfy the predefined document merge resolution threshold, generating a suggested document merge resolution recommendation based on the selected document merge resolution. The computer-implemented method also includes displaying the suggested document merge resolution recommendation on an interactive user interface associated with a client computing device related to a dominant user, where the dominant user is associated with a user profile of the two or more user profiles, and where the dominant user is determined by the document merge model.

The computer-implemented method further includes receiving a confirmation signal associated with the suggested document merge resolution recommendation, where the confirmation signal is generated by the client computing device associated with the dominant user, and where the confirmation signal comprises an acceptance of the suggested document merge resolution recommendation or a rejection of the suggested document merge resolution recommendation. The computer-implemented method also includes, in response to receiving a confirmation signal comprising the acceptance of the suggested document merge resolution recommendation, updating the collaborative document to incorporate the suggested document merge resolution recommendation. The computer-implemented method also includes storing the updated collaborative document in a document collaboration data repository associated with the document collaboration platform. The computer-implemented method also includes retraining the document merge model based on the confirmation signal comprising the acceptance of the suggested document merge resolution recommendation.

The computer-implemented method further includes generating a document merge resolution associated with a second user profile passage associated with a second user profile, where the document merge resolution associated with the second user profile passage is generated based on a document conflict associated with a first user profile passage associated with a first user profile identifier.

The computer-implemented method further includes generating a document merge resolution comprising a third user profile passage based on a document conflict associated with a first user profile passage associated with a first user profile and a second user profile passage associated with a second user profile.

The computer-implemented method further includes generating sequenced textual content based on the one or more user input step events, where the sequenced textual content can be associated with the two or more user profiles. The computer-implemented method also includes rendering, on one or more interactive user interfaces associated with the collaborative document, the sequenced textual content.

The computer-implemented method further includes where the one or more document conflicts comprise at least one of a duplicate textual content conflict, a duplicate subject matter conflict, a document item sequencing conflict, or a document markup conflict.

The computer-implemented method further includes where the one or more document merge resolutions comprise at least one of a textual content deletion resolution, a textual content merging resolution, a document item resequencing resolution, or a textual content markup resolution.

The computer-implemented method further includes where the document merge model can be trained based in part on one or more collaborative documents stored in a data repository of a particular document collaboration platform, and where the one or more collaborative documents comprise one or more user profile passages associated with one or more respective user profiles associated with the particular document collaboration platform.

In one aspect, a non-transitory computer-readable storage medium for automatically generating adaptive digital content for a collaborative document includes instructions that when executed by at least one processor, cause the at least one processor to receive multi-user input data associated with the collaborative document, where the multi-user input data is generated by two or more client computing devices associated with two or more user profiles supported by a document collaboration platform. The non-transitory computer-readable storage medium also includes instructions configured to generate, via the document collaboration platform, one or more user input step events based on the multi-user input data, where each of the one or more user input step events are associated with a respective user profile of the two or more user profiles. The non-transitory computer-readable storage medium also includes instructions configured to generate, based on the one or more user input step events, a document object representative of the collaborative document. The non-transitory computer-readable storage medium also includes instructions configured to determine one or more document conflicts associated with the collaborative document based on application of a document merge model to the document object. The non-transitory computer-readable storage medium also includes instructions configured to generate, based on the one or more document conflicts, one or more document merge resolutions, where the one or more document merge resolutions are associated with a respective merge resolution confidence score. The non-transitory computer-readable storage medium also includes instructions configured to, in response to a determination that a merge resolution confidence score associated with a selected document merge resolution of the one or more document merge resolutions satisfies a predefined document merge resolution threshold, update the collaborative document to incorporate the selected document merge resolution.

The non-transitory computer-readable storage medium further includes instructions configured to, in response to a determination that a merge resolution confidence score associated with the selected document merge resolution of the one or more document merge resolutions does not satisfy the predefined document merge resolution threshold, generate a suggested document merge resolution recommendation based on the selected document merge resolution. The non-transitory computer-readable storage medium also includes instructions configured to display the suggested document merge resolution recommendation on an interactive user interface associated with a client computing device related to a dominant user, where the dominant user is associated with a user profile of the two or more user profiles, and where the dominant user is determined by the document merge model.

The non-transitory computer-readable storage medium also includes instructions configured to receive a confirmation signal associated with the suggested document merge resolution recommendation, where the confirmation signal is generated by the client computing device associated with the dominant user, and where the confirmation signal comprises an acceptance of the suggested document merge resolution recommendation or a rejection of the suggested document merge resolution recommendation. The non-transitory computer-readable storage medium also includes instructions configured to, in response to receiving a confirmation signal comprising the acceptance of the suggested document merge resolution recommendation, update the collaborative document to incorporate the suggested document merge resolution recommendation. The non-transitory computer-readable storage medium also includes instructions configured to store the updated collaborative document in a document collaboration data repository associated with the document collaboration platform. The non-transitory computer-readable storage medium also includes instructions configured to retrain the document merge model based on the confirmation signal comprising the acceptance of the suggested document merge resolution recommendation.

The non-transitory computer-readable storage medium further includes instructions configured to generate a document merge resolution associated with a second user profile passage associated with a second user profile, where the document merge resolution associated with the second user profile passage is generated based on a document conflict associated with a first user profile passage associated with a first user profile identifier.

The non-transitory computer-readable storage medium further includes instructions configured to generate a document merge resolution comprising a third user profile passage based on a document conflict associated with a first user profile passage associated with a first user profile and a second user profile passage associated with a second user profile.

The non-transitory computer-readable storage medium further includes instructions configured to generate sequenced textual content based on the one or more user input step events, where the sequenced textual content can be associated with the two or more user profiles. The non-transitory computer-readable storage medium also includes instructions configured to render, on one or more interactive user interfaces associated with the collaborative document, the sequenced textual content.

The non-transitory computer-readable storage medium further includes where the one or more document conflicts comprise at least one of a duplicate textual content conflict, a duplicate subject matter conflict, a document item sequencing conflict, or a document markup conflict.

The non-transitory computer-readable storage medium further includes where the one or more document merge resolutions comprise at least one of a textual content deletion resolution, a textual content merging resolution, a document item resequencing resolution, or a textual content markup resolution.

The non-transitory computer-readable storage medium further includes where the document merge model can be trained based in part on one or more collaborative documents stored in a data repository of a particular document collaboration platform, and where the one or more collaborative documents comprise one or more user profile passages associated with one or more respective user profiles associated with the particular document collaboration platform.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

DETAILED DESCRIPTION

Figure 1:
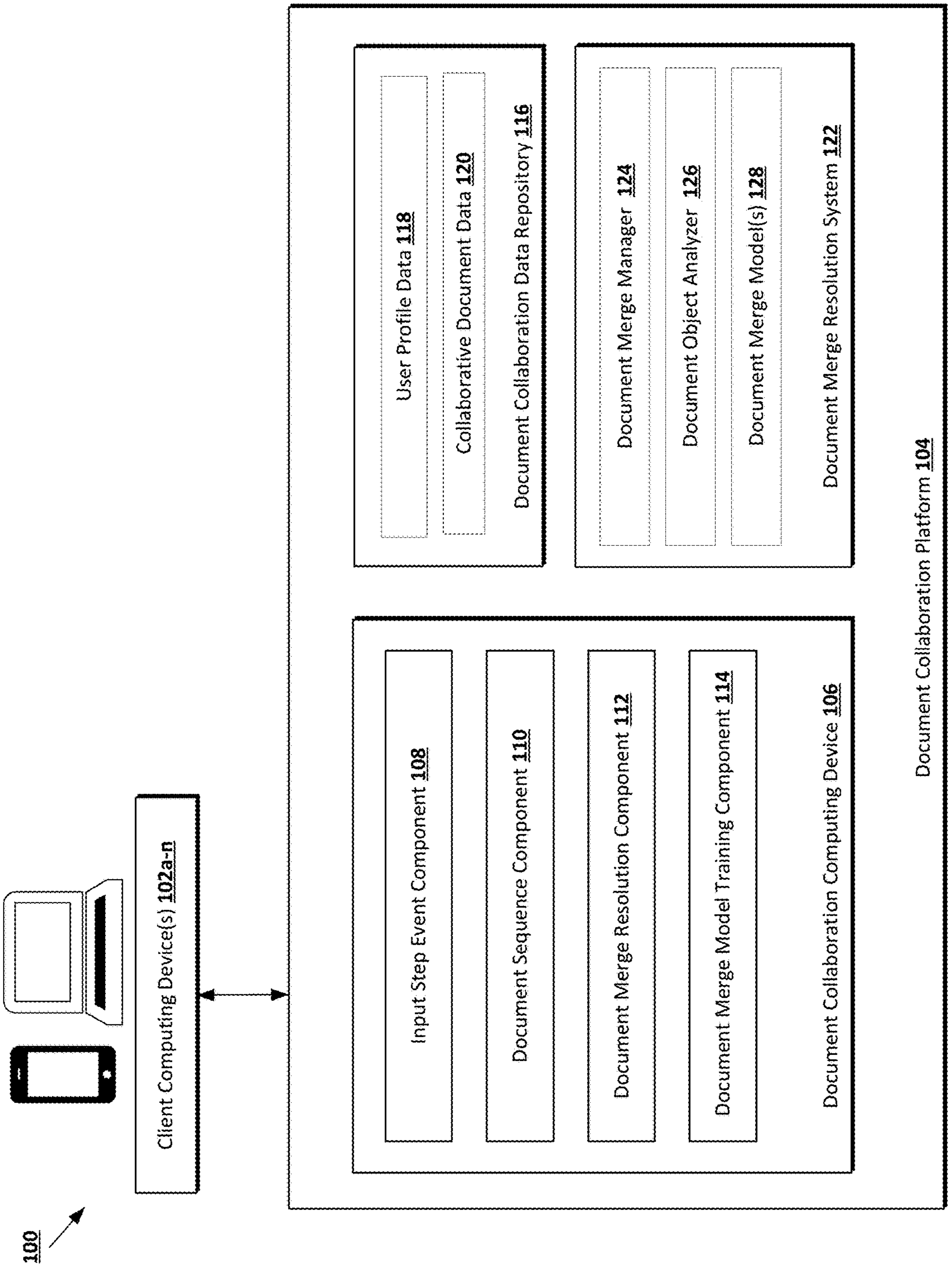
FIG. 1 is a block diagram of an exemplary document collaboration platform architecture configured for automatic multi-user input merge resolution for a collaborative document in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms “illustrative,” “example,” and “exemplary” are used to be examples with no indication of quality level. Like numbers refer to like elements throughout.

Overview

Various embodiments of the present invention address technical problems associated with automatically resolving document conflicts and merging multi-user inputs for collaborative documents. The disclosed techniques can be utilized by a document collaboration platform to automatically resolve document conflicts related to textual content in a collaborative document being accessed by two or more client computing devices associated with two or more respective user profiles supported by the document collaboration platform. Various embodiments are configured to employ various machine learning models to automatically generate document merge resolutions. The document merge resolutions can be generated for one or more respective user profiles based on one or more document conflicts detected in textual content comprised in the collaborative document. An example of a document collaboration platform that may use the automatic merge resolution techniques disclosed herein is the Confluence® collaborative document management platform that is offered by Atlassian PTY LTD.

Automatically resolving document conflicts for one or more user profiles in the context of multi-user collaboration (i.e., while a client computing device associated with a first user profile is simultaneously collaborating with one or more other client computing devices associated with one or more other respective user profiles) presents a difficult challenge. Traditionally, textual content generation tools (e.g., word processing software applications) are only configured to detect a limited amount of spelling and/or grammatical errors generated by an end user. Similar limitations apply to various document collaboration platforms that host cloud-based word processing applications. Such textual content generation tools fail to consider subject matter and/or textual content duplication errors generated by multiple client computing devices associated with multiple respective user profiles that are simultaneously generating textual content in the same collaborative document.

Furthermore, current implementations of various collaborative, cloud-based word processing applications utilize imperative programming techniques in order to address conflicts that arise within a collaborative document. Such cloud-based word processing applications resolve document conflicts using fixed algorithms and data structures such as, for example, operational transformation algorithms and conflict-free replicated data types (CRDT). Such algorithms only address the structural nature of document conflicts and do not capture user intent and/or an overall document intent to provide sensible merge resolutions.

Embodiments of the present disclosure provide various technical improvements to traditional cloud-based document collaboration platforms by capturing the semantic nature of a collaborative document in addition to any structural conflicts that may be present. For example, embodiments of the present disclosure are configured to resolve document conflicts in part by determining the intent of two or more users generating textual content for a collaborative document. Additionally, embodiments of the present disclosure are configured to resolve document conflicts in part by determining a document intent reflecting the overall subject matter and/or objectives of the two or more users generating textual content for the collaborative document.

Moreover, embodiments of the present disclosure provide technical improvements traditional cloud-based collaborative document platforms by capturing corrective actions associated with fallacious document merge resolutions. Embodiments of the present application employ one or more machine learning based document merge models configured to generate one or more document merge resolutions in response to one or more document conflicts comprised within a collaborative document. The document merge models are iteratively trained and refined over time, and data associated with inaccurate or undesired document merge resolutions can be used to iteratively train and improve the document merge models over time as more collaborative documents are generated via the document collaboration platform.

Various embodiments of the present invention are configured to automatically generate document merge resolutions for one or more user profiles associated with one or more respective client computing devices simultaneously accessing a collaborative document. The document merge resolutions are generated in response to a determination that one or more document conflicts exist in the textual content of the collaborative document. The document merge resolutions are also generated such that a group-level intent associated with the one or more user profiles is fully represented by the textual content being generated for the collaborative document.

Automatic document merge resolution techniques, such as the ones disclosed herein, can overcome the challenge of generating textual content for a collaborative document related to multiple user profiles associated with multiple respective client computing devices. Automatically, efficiently, and simultaneously generating document merge resolutions for multiple client computing devices in a collaborative document reduces the computational load associated with the respective document collaboration platform and said client computing devices. Additionally, the techniques described herein reduce the time, human resources, and mental load on one or more end users related to the one or more user profiles associated with one or more respective client computing devices that are simultaneously generating textual content for the collaborative document.

In exemplary embodiments, the document collaboration platform embodies and/or integrates with various computing devices, systems, non-transitory data repositories, machine learning models, and/or communication networks for automatically resolving one or more document conflicts generated by one or more client computing devices simultaneously generating textual content for a collaborative document. For example, the document collaboration platform comprises and/or integrates with one or more client computing devices, one or more document collaboration computing devices, a document collaboration data repository, and a document merge resolution system.

In one example scenario, two end users Alice and Bob associated with two respective user profiles can simultaneously generate textual content for a collaborative document via two respective client computing devices. In certain circumstances, one or more document conflicts can occur as Alice and Bob are simultaneously generating textual content for the collaborative document. The one or more document conflicts can be situations in which two or more client computing devices associated with the two or more respective user profiles have generated two or more portions of textual content that are the same or similar within the same collaborative document. Document conflicts can comprise, but are not limited to, a duplicate textual content conflict, a duplicate subject matter conflict, a document item sequencing conflict, and/or a document markup conflict.

For example, Alice and Bob can be simultaneously generating multiple passages of textual content for a collaborative document. Bob might not notice that he has generated one or more passages of textual content that are the same or similar to one or more passages of textual content that was previously generated by Alice. As such, one or more document conflicts may have occurred with respect to the one or more passages of textual content that Alice and Bob have generated for the same collaborative document.

For instance, Bob may have introduced a duplicate textual content conflict in which he generated the same textual content as Alice. Alternatively, Bob may have introduced a duplicate subject matter conflict in which he generated textual content directed towards the same subject matter already discussed by one or more portions of textual content previously generated by Alice. Alternatively, Bob may have introduced a document item sequencing conflict while he and Alice were simultaneously generating a numbered or alphabetized list. Such document item sequencing conflicts can comprise ordering conflicts as well as duplicate subject matter conflicts between two or more list items. Alternatively, Bob may have introduced a document markup conflict in which he formatted one or more portions of textual content that contradicts prior formatting executed by Alice. For example, Bob may have changed the color and/or emphasis of one or more portions of textual content in the collaborative document. Embodiments of the present disclosure are configured to automatically resolve one or more document conflicts generated by two or more client computing devices associated with two or more respective user profiles such as Alice and Bob.

As the two or more client computing devices are simultaneously generating textual content for the collaborative document, a document collaboration computing device is configured to repeatedly transmit one or more portions of the textual content to the document merge resolution system. In this manner, the document merge resolution system can detect one or more document conflicts as the two or more client computing devices continue to generate textual content for the collaborative document. The document merge resolution system comprises one or more document merge models which can determine one or more document conflicts associated with the collaborative document based on the one or more portions of textual content generated by the two or more client computing devices. The document merge models can also generate document merge resolutions directed towards addressing the one or more document conflicts.

The document merge resolutions generated by the document merge models can comprise, but are not limited to, one or more textual content deletion resolutions, one or more textual content merging resolutions, one or more document item resequencing resolutions, and/or one or more textual content markup resolutions. In various circumstances, the document merge resolutions generated by the document merge model can comprise document merge resolutions that are combinations of one or more textual content deletion resolutions, one or more textual content merging resolutions, one or more document item resequencing resolutions, and/or one or more textual content markup resolutions.

For instance, as a non-limiting example, a document conflict can arise as the two client computing devices associated with the two respective user profiles Alice and Bob are simultaneously generating the same or similar textual content for the collaborative document (e.g., a duplicate textual content conflict). The document merge resolution system can detect the document conflict and generate document merge resolutions to address said document conflict and transmit the document merge resolutions to the document collaboration computing device.

In certain scenarios, the document merge resolutions can be automatically incorporated into the collaborative document. For example, the document merge resolution system can assign a merge resolution confidence score to each of the one or more document merge resolutions generated by the document merge models. If the merge resolution confidence score associated with a particular document merge resolution satisfies a predefined document merge resolution threshold, the document merge resolutions generated by the document merge models can be automatically incorporated into the collaborative document.

The document merge resolutions that are automatically incorporated into the collaborative document are persisted unless a client computing device associated with a user profile reverts the document merge resolutions thereby undoing the changes. If an end user (e.g., Alice or Bob) does not revert the automatically incorporated document merge resolutions, the document collaboration computing device can transmit a positive confirmation signal to the document merge resolution system. Alternatively, if an end user (e.g., Alice or Bob) decides to revert the automatically incorporated document merge resolutions, the document collaboration computing device can transmit a negative confirmation signal to the document merge resolution system. As such, the positive or negative confirmation signal associated with the automatically incorporated document merge resolutions can be employed to refine the document merge models to better calculate future merge resolution confidence scores for future document merge resolutions associated with one or more future document conflicts.

In one or more embodiments, if a particular document merge resolution is associated with a merge resolution confidence score below the predefined document merge resolution threshold, a suggested document merge resolution recommendation associated with the particular document merge resolution generated by the document merge models can be presented to an end user (e.g., Alice or Bob) prompting the end user to affirmatively or negatively confirm the incorporation of the suggested document merge resolution recommendation into the collaborative document.

A client computing device of the two client computing devices associated with the two respective user profiles Alice and Bob can transmit a confirmation signal to the document collaboration computing device in order to approve or deny the incorporation of the suggested document merge resolution recommendations into the collaborative document. For example, if the client computing device associated with the user profile Bob transmits a positive confirmation signal approving the incorporation of the suggested document merge resolution recommendations, the document collaboration computing device finalizes and incorporates the suggested document merge resolution recommendations into the collaborative document. The positive confirmation signal approving the incorporation of the suggested document merge resolution recommendation can be employed to refine the document merge models to better calculate future merge resolution confidence scores for future document merge resolutions associated with one or more future document conflicts.

In various embodiments, the document collaboration computing device can render the suggested document merge resolution recommendations on the interactive user interfaces associated with the collaborative document in various alternate text formats to indicate that the suggested document merge resolution recommendations have not yet been incorporated into the collaborative document. Once the suggested document merge resolution recommendations are approved by a client computing device of the two client computing devices, the alternate text formatting based on the suggested document merge resolution recommendations are removed, and the suggested document merge resolution recommendations are incorporated into the collaborative document and rendered on one or more interactive user interfaces as sequenced textual content. The collaborative document is thereby updated and can be updated and/or stored in the document collaboration data repository associated with the document collaboration platform.

It will be appreciated that while the exemplary embodiment described above pertains to automatic document merge resolutions for two user profiles associated with two respective client computing devices simultaneously generating textual content for a single collaborative document, the document collaboration platform is configured to perform the automatic document merge resolution techniques described herein for more than two user client computing devices simultaneously generating textual content for a collaborative document.

Definitions

The term "collaborative document" refers to a data construct that comprises textual content of a digital file that can be generated based on various types of file formats, where the textual content of the file is configured to be editable/accessible by one or more client computing devices associated with one or more respective user profiles. For example, the textual content can include, but is not limited to, text, lists, tables, spreadsheets, flowcharts, and/or the like. A document collaboration computing device associated with a document collaboration platform can generate one or more interactive user interfaces associated with a particular collaborative document such that one or more client computing devices associated with one or more respective user profiles can simultaneously generate, update, and/or remove sequenced textual content associated with the collaborative document. One or more collaborative documents can be stored in a document collaboration data repository of a document collaboration platform that comprises the document collaboration computing device. For example, the document collaboration platform may enable a first user profile to share a collaborative document with one or more other user profiles, where each of the one or more user profiles may be given defined read/write access privileges to the collaborative document. An example of a collaborative document is a Confluence® page.

The term "document collaboration platform" refers to a collaborative work platform directed towards enabling one or more client computing devices associated with one or more respective user profiles associated with a company, enterprise, and/or other organizational structure to work simultaneously on documents, projects, and/or other various types of deliverables. A document collaboration computing device associated with a document collaboration platform can generate one or more interactive user interfaces associated with a particular collaborative document such that one or more client computing devices associated with one or more respective user profiles can simultaneously generate, update, and/or remove sequenced textual content associated with the collaborative document. As such, the same representation of sequenced textual content associated with a particular collaborative document is rendered on one or more respective interactive user interfaces associated with the one or more client computing devices, and any generation, update, and/or removal of the sequenced textual content is rendered in near real time on the one or more respective interactive user interfaces.

A document collaboration platform can store a large number of collaborative documents that may be accessible/editable by one or more user profiles. Each collaborative document may at each time be accessed by a group of user profiles that is larger than the group of user profiles that created the documents, and different portions of collaborative documents may be created by different user profiles. Moreover, various collaborative documents created by different groups of user profiles may contain links/references to each other and may enable user profiles to transition from one collaborative document to another collaborative document by selecting the noted links/references. An example of a document collaboration platform that may use the automatic multi-user input merge resolution techniques disclosed herein is the Confluence® collaborative document management platform that is owned by Atlassian PTY LTD.

The term "multi-user input data" refers to data associated with one or more input commands generated by one or more peripheral input devices capable of manipulating a client computing device. For example, the one or more input commands can be commands issued by a computer mouse, computer keyboard, electronic touchpad, interactive touch display, electronic stylus, and/or the like. The one or more input commands can be directed towards configuring one or more portions of sequenced textual content rendered via an interactive user interface associated with a collaborative document. The multi-user input data can be associated with a user profile identifier corresponding to a user profile stored in a document collaboration data repository associated with the document collaboration platform.

The term "user input step event" refers to a structured, electronically managed data object generated via a document collaboration computing device based on one or more portions of multi-user input data. A user input step event can contain various portions of metadata related to, but not limited by, an input step event type (e.g., replace, addText, removeText, addStyle, or removeStyle), an input step event sequence range, a textual content type identifier, one or more portions of textual content data, a user profile identifier, and/or timestamp data associated with the user input step event. The metadata comprised in one or more user input step events can be used by the document collaboration computing device to generate one or more portions of sequenced textual content for rendering on one or more interactive user interfaces associated with a particular collaborative document. The metadata comprised in one or more user input step events can also be used by the document collaboration computing device to generate one or more user profile passages associated with a user profile.

The term "sequenced textual content" refers to organized textual content that can be rendered on one or more interactive user interfaces associated with a particular collaborative document and represents the textual content associated with the collaborative document. The sequenced textual content associated with the collaborative document can be rich text content comprising various formatting options (e.g., emphases such as bold and/or italics). The sequenced textual content is generated by a document collaboration computing device based on the data comprised in one or more user input step events associated with a particular collaborative document. For instance, the document collaboration computing device can parse, structure, and/or organize the metadata related to the one or more user input step events associated with one or more user profiles that are simultaneously generating textual content (e.g., text, lists, tables, spreadsheets, flowcharts, and/or the like) for a collaborative document such that the simultaneously generated textual content is correctly organized and rendered as sequenced textual content on one or more respective interactive user interfaces associated with the collaborative document. The document collaboration computing device can organize and structure the sequenced textual content based on various combinations of metadata associated with the one or more user input step events, such as, for example, the timestamp data and input step event sequence range associated with the one or more user input step events.

In an embodiment, a document collaboration computing device associated with a document collaboration platform can generate one or more interactive user interfaces associated with a particular collaborative document such that one or more client computing devices associated with one or more respective user profiles can simultaneously generate, update, and/or remove the sequenced textual content associated with a particular collaborative document. As such, the same representation of the sequenced textual content associated with the particular collaborative document is rendered on the one or more respective interactive user interfaces associated with the one or more client computing devices, and any generation, update, and/or removal of the sequenced textual content is rendered in near real time on the one or more respective interactive user interfaces.

The term "document merge resolution system" refers to a system associated with a document collaboration platform configured to determine one or more document conflicts associated with a collaborative document and generate, based on the one or more document conflicts, one or more document merge resolutions associated with one or more respective user profiles associated with the collaborative document. As multiple client computing devices associated with multiple respective user profiles are simultaneously generating textual content for a collaborative document, document conflicts can occur. As a non-limiting example, a document conflict arises when two client computing devices associated with two respective user profiles generate the same or similar textual content for the collaborative document. In such a scenario, the document merge resolution system can employ a document merge model to detect the document conflict and generate one or more respective document merge resolutions with which to resolve the document conflict.

The document merge resolution system can also be employed to merge online and offline versions of the same collaborative documents by detecting one or more document conflicts between the online and offline versions of the collaborative documents and generating one or more corresponding document merge resolutions. For example, in the event that one or more client computing devices of the two or more client computing devices generating textual content for a collaborative document loses connectivity to the document collaboration platform during a collaborative editing session, a "local" offline version of the collaborative document can be stored on the one or more client computing devices that lost connectivity.

In such a scenario, the one or more client computing devices can continue to generate and/or update textual content associated with the offline version of the collaborative document. When the one or more client computing devices regains connectivity to the document collaboration platform, the document merge resolution system can automatically merge the offline version of the collaborative document with the current online version of the collaborative document by resolving any document conflicts between the offline and online versions of the collaborative document. The updated online version of the collaborative document can be stored in a document collaboration data repository associated with the document collaboration platform.

The document merge resolution system is configured to receive one or more user input step events associated with a particular collaborative document from the document collaboration computing device. The document merge resolution system enqueues the one or more user input step events into an event processing queue in order to maintain the sequence of the one or more user input step events and employs a document merge manager to generate a document object representative of the collaborative document based on the contents of the event processing queue and other metadata collected from the collaborative document. A document object analyzer of the document merge resolution system is employed to determine whether an entire document object should be used to detect document conflicts and generate corresponding document merge resolutions, or whether one or more portions of the document object (e.g., one or more portions of textual content and/or one or more user profile passages comprised in the collaborative document) should be used to detect document conflicts and generate corresponding document merge resolutions.

The document merge resolution system is also configured to generate collaborator metadata from the one or more user input step events and/or the collaborative document. In various embodiments, the collaborator metadata can comprise metadata including, but not limited to, one or more user profiles, a document position associated with one or more dynamic text insertion cursors associated with a respective user profile, and/or other metadata associated with the one or more user profiles.

The document merge resolution system is also configured to locate, fetch, employ, update, store, and/or remove one or more document merge models associated with the document collaboration platform. In some embodiments, a document merge model can be neural language model trained based in part on one or more collaborative documents stored by a particular document collaboration platform, where the one or more collaborative documents comprise one or more user profile passages associated with one or more respective user profiles associated with the particular document collaboration platform. The document merge resolution system can employ the document merge models to detect one or more document conflicts in a collaborative document and generate, based on the one or more document conflicts, one or more corresponding document merge resolutions.

The term "document conflict" refers to a situation in which two or more client computing devices associated with two or more respective user profiles have generated two or more portions of textual content that are the same or similar within the same collaborative document. Document conflicts can comprise, but are not limited to, a duplicate textual content conflict, a duplicate subject matter conflict, a document item sequencing conflict, and/or a document markup conflict. A duplicate textual content conflict can be a situation in which two or more client computing devices associated with two or more respective user profiles have generated two or more portions of textual content that are the same or similar. In various embodiments, a document merge model can apply various neural language processing algorithms in order to detect when two or more portions of textual content are similar, but not quite the same. The document merge model can generate one or more document merge resolutions to address the duplicate textual content conflict, such as, for example, a recommendation to delete the portion of textual content comprising the duplicated textual content.

A duplicate subject matter conflict can be a situation in which two or more client computing devices associated with two or more respective user profiles have generated one or more portions of textual content that are directed towards the same subject matter. While the two or more portions of textual content may not use the exact same language, the document merge model can detect that the two or more portions of textual content are directed towards the same subject matter, and generate document merge resolutions that comprise merging, editing, and or updating the two or more portions of textual content.

A document item sequencing conflict can be a situation in which two or more client computing devices associated with two or more respective user profiles are generating numbered or alphabetized lists in a collaborative document and a client computing device of the two or more client computing devices generates a list item with a duplicate number or letter. The document merge model can detect the sequencing or alphabetizing conflict and generate a document merge resolution to correctly sequence the numbered or alphabetized list. In some embodiments, the document merge model can automatically update the collaborative document such that the numbered or alphabetized list is correctly sequenced without intervention by the two or more client computing devices.

Additionally or alternatively, a document item sequencing conflict can be a situation in which two or more list items comprised in a numbered or alphabetized list in a collaborative document comprise two or more portions of textual content that are the same or similar, and/or are directed towards the same subject matter. The document merge model can determine that one or more list items need to be deleted, updated, merged, and/or combined.

A document markup conflict can be a situation in which two or more client computing devices associated with two or more respective user profiles are simultaneously formatting one or more portions of sequenced textual content. For example, a first client computing device associated with a first user profile may have formatted a portion of sequenced textual content to italicized and a second client computing device associated with a second user profile may have formatted the same portion of sequenced textual content to have a bold emphasis. The document merge model can determine that an exclusive merge resolution should be made such that either the italic formatting or the bold formatting should be removed. Alternatively, the document merge model can determine that an additive merge resolution should be made such that both the italic and bold formats should be applied to the textual content.

As another example of a document markup conflict, the first client computing device associated with the first user profile may have changed a portion of sequenced textual content to a first color (e.g., blue) and the second client computing device associated with the second user profile may have changed the same portion of sequenced textual content to a second color (e.g., red). The document merge model can determine that an exclusive merge resolution should be made such that said portion of sequenced textual content should be red or blue.

The term "document merge model" refers to a machine-learning-based model configured to receive one or more portions of a document object generated by a document merge manager associated with a document merge resolution system and one or more portions of metadata associated with the collaborative document (e.g., collaborator metadata) as model input. Based on the document object and the one or more portions of metadata associated with the collaborative document, the document merge model is configured to detect one or more document conflicts and automatically generate one or more document merge resolutions in response.

The document object representing the collaborative document is built incrementally by the document merge manager (discussed in further detail below) based on the simultaneous contributions of the two or more client computing devices generating textual content for the collaborative document. As such, the model input sequence and subsequent model output sequence executed by the document merge model can be understood by the following simplified method: predict(X, XA, XB)=Y.

In this method, X can be understood as a baseline input sequence representing the textual content associated with the collaborative document and comprised in the document object. XA can be understood as the modifications on X by a first user profile A that are comprised in the document object, and XB can be understood as the modifications on X by a second user profile B that are comprised in the document object. Finally, the output sequence Y can be understood as the one or more document merge resolutions generated by the document merge model based on the inputs X, XA, and XB.

The document merge model can calculate a merge resolution confidence score for each of the one or more document merge resolutions. In various embodiments, the merge resolution confidence score can be derived based on previously generated document merge resolutions that were associated with positive confirmation signals.

In one or more embodiments, the document merge model can determine a dominant user associated with one or more suggested document merge resolution recommendations. The document merge model can determine the dominant user based on one or more pieces of metadata comprised in the document object (e.g., document identifier) as well as one or more portions of collaborator metadata (e.g., a user profile identifier) that were used as model input. The dominant user can be an end user related to a user profile associated with a client computing device that generated a majority of the textual content corresponding to one or more document conflicts associated with the one or more suggested document merge resolution recommendations.

Additionally or alternatively, a dominant user can be associated with a user profile corresponding to a client computing device that generated the collaborative document. Additionally or alternatively, the dominant user can be determined locally within a particular collaborative document depending on one or more user profile passages comprised within the collaborative document and/or depending on a relative typing position within the collaborative document that is associated with a particular client computing device.

In various embodiments, a document merge model can be a machine learning model configured based on an artificial neural network (ANN) (e.g., such as a transformer model), a recurrent neural network (RNN) (e.g., such as a sequence-to-sequence model), a convolutional neural network (CNN), a natural language processing (NLP) model, and/or any other relevant deep learning model configured to employ artificial intelligence and/or machine reasoning to generate document merge resolutions based on model input provided by a document collaboration computing device. One or more document merge models can be trained based on one or more portions of data comprised in a document collaboration data repository associated with a particular document collaboration platform, where the document collaboration data repository comprises user profile data associated with one or more user profiles as well as collaborative document data associated with one or more collaborative documents generated by one or more client computing devices associated with the one or more user profiles.

For example, a document merge model can be trained based in part on one or more collaborative documents stored by a particular document collaboration platform, where the one or more collaborative documents comprise one or more user profile passages associated with one or more respective user profiles associated with the particular document collaboration platform. Additionally, any metadata associated with the one or more user profiles, any metadata associated with the one or more collaborative documents, any metadata associated with one or more user input step events, and/or any metadata associated with one or more portions of textual content stored in the document collaboration data repository can be used to train the one or more document merge models.

The document merge resolutions generated by a document merge model trained based in part on the one or more collaborative documents can reflect an enterprise merge resolution style reflecting a defined presentation style associated with a particular company, enterprise, and/or other organizational structure. In this regard, textual content can be generated to reflect the lexicon, preferred writing style, history, values, mission, objectives, goals, and/or public-facing persona associated with the particular company, enterprise, and/or other organizational structure as a result of automatically resolving one or more document conflicts within a collaborative document.

For example, in an instance where the document merge model determines a document merge resolution that merges and/or combines two user profile passages of textual content in a collaborative document (e.g., in response to a duplicate subject matter conflict), the document merge model can generate a document merge resolution representing a new, third user profile passage. In such an instance, the document merge resolution related to the new, third user profile passage can reflect the enterprise merge resolution style reflecting a defined presentation style associated with a particular company, enterprise, and/or other organizational structure.

Additionally and/or alternatively, a document merge model can be a neural language model trained based in part on a global corpus of documents scraped from the Internet and can generate document merge resolutions based on the contents of the global corpus of documents in response to receiving model input associated with the collaborative document from the document collaboration computing device.

The term "document merge resolution" refers to a corrective reconfiguration, update, deletion, merger, combination, reformatting, and/or the like for one or more portions of textual content associated with a collaborative document. Document merge resolutions are generated by a document merge model to address one or more document conflicts in the collaborative document. The one or more document merge resolutions can comprise, but are not limited to, one or more textual content deletion resolutions, one or more textual content merging resolutions, one or more document item resequencing resolutions, and/or one or more textual content markup resolutions. In various circumstances, the document merge resolutions generated by the document merge model can comprise one or more document merge resolutions that are combinations of one or more textual content deletion resolutions, one or more textual content merging resolutions, one or more document item resequencing resolutions, and/or one or more textual content markup resolutions.

A textual content deletion resolution can be a resolution to delete one or more portions of textual content generated for a collaborative document by one or more client computing devices associated with one or more respective user profiles. A document item resequencing resolution can be a resolution to eliminate and/or re-sequence a numbered or alphabetized one or more list items with erroneous numbering or alphabetization. In some embodiments, the document merge model can automatically update and/or re-sequence a numbered or alphabetized list comprising sequencing errors without intervention (e.g., a confirmation signal) by the two or more client computing devices generating the numbered or alphabetized list. Additionally or alternatively, a document item resequencing resolution can be a resolution to delete, update, merge, and/or combine two or more list items that comprise two or more portions of textual content that are the same or similar, and/or are directed towards the same subject matter.

A textual content merging resolution can be a resolution to merge and/or combine two or more portions of textual content in a collaborative document. For example, if the document merge model detects a duplicate subject matter conflict in which two or more user profile passages in a collaborative document are directed to the same or similar subject matter, the document merge model can merge and/or combine the two or more user profile passages. In circumstances where two or more user profile passages in a collaborative document are merged and/or combined, a third user profile passage can be generated and the two or more user profile passages that were merged and/or combined can be deleted such that collaborative document remains structured, organized, and logical.

A textual content markup resolution can be a resolution to remove or merge two or more types of text markup formatting for a particular portion of sequenced textual content. For example, if the document merge model detects a document markup conflict in which a particular portion of sequenced textual content has been formatted in various way by two or more client computing devices, the document merge model can determine whether to remove one or more of the various text markup formats or combine the text markup formats. In circumstances in which the text markup can't be combined (e.g., if two client computing devices have both attempted to change the color of the sequenced textual content) the document merge model can determine which text markup change will be prioritized. When appropriate, the document merge model can determine that the two or more types of text markup formatting should be merged. For example, if a first client computing device attempts to italicize a portion of sequenced textual content while a second client computing device attempts to bolden the same portion of sequenced textual content.

The document merge model can calculate a merge resolution confidence score for each of the one or more document merge resolutions generated in response to one or more respective document conflicts comprised in a collaborative document. In various embodiments, the merge resolution confidence score can be derived based on previously generated document merge resolutions that were associated with positive confirmation signals.

For example, in scenarios where the merge resolution confidence score associated with a particular document merge resolution satisfies a predefined document merge resolution threshold, the document merge resolution generated by the document merge model can be automatically incorporated into the collaborative document. If a client computing device does not revert the automatically incorporated document merge resolution, the document collaboration computing device can transmit a positive confirmation signal to the document merge resolution system. As such, the positive confirmation signal associated with the automatically incorporated document merge resolutions can be employed to refine the document merge models to better calculate future merge resolution confidence scores for future document merge resolutions associated with one or more future document conflicts.

Alternatively, if a particular document merge resolution is associated with a merge resolution confidence score below the predefined document merge resolution threshold, a suggested document merge resolution recommendation associated with the particular document merge resolution generated by the document merge models can be presented via one or more interactive user interfaces associated with the collaborative document thereby prompting the end user to affirmatively or negatively confirm the incorporation of the suggested document merge resolution recommendation into the collaborative document. The positive and/or negative confirmation signals respectively approving and/or rejecting the incorporation of the suggested document merge resolution recommendations can be employed to refine the document merge model to better calculate future merge resolution confidence scores for future document merge resolutions associated with one or more future document conflicts.

The term "suggested document merge resolution recommendation" refers to a document merge resolution rendered by a document collaboration computing device on one or more interactive user interfaces associated with a particular collaborative document. The document collaboration computing device generates the suggested document merge resolution recommendation based on one or more document merge resolutions generated by a document merge model that are associated with a merge resolution confidence score below a predefined document merge resolution threshold, where the model input transmitted to the document merge model was one or more user input step events, one or more portions of textual content, and/or one or more user profile passages associated with the particular collaborative document.

In some embodiments, the suggested document merge resolution recommendation is only rendered on an interactive user interface associated with a client computing device related to a user profile designated as a dominant user. The dominant user is associated with a user profile responsible for generating a majority of the textual content related to the one or more document conflicts related to the suggested document merge resolution recommendation. In other embodiments the suggested document merge resolution recommendation is rendered on the two or more client computing devices generating textual content for the collaborative document, however the one or more client computing devices that aren't designated at the dominant user are only able to see "read-only" versions of the textual content associated with the suggested document merge resolution recommendation.

For example, as multiple client computing devices associated with multiple respective user profiles are simultaneously generating textual content for a collaborative document, document conflicts can occur. For instance, as a non-limiting example, a document conflict arises when two client computing devices associated with two respective user profiles generate the same or similar textual content for the collaborative document (e.g., a duplicate textual content conflict). The document merge resolution system can detect the document conflict and generate one or more document merge resolutions to address said document conflict and transmit the document merge resolutions to the document collaboration computing device. If the one or more document merge resolutions are assigned a merge resolution confidence score above a predefined document merge resolution threshold, the document merge resolution system can direct the document collaboration computing device to automatically incorporate the one or more document merge resolutions into the collaborative document.

Alternatively, if the one or more document merge resolutions are assigned a merge resolution confidence score below the predefined document merge resolution threshold, the document merge resolution system can direct the document collaboration computing device to generate a suggested document merge resolution recommendation based on the one or more document merge resolutions and render the suggested document merge resolution recommendation on one or more interactive user interfaces associated with the collaborative document (e.g., an interactive user interface associated with the dominant user).

The client computing device associated with the dominant user profile can transmit a confirmation signal to the document collaboration computing device in order to approve or deny the incorporation of the suggested document merge resolution recommendations into the collaborative document. If the client computing device associated with the dominant user profile transmits a confirmation signal approving the incorporation of the suggested document merge resolution recommendations, the document collaboration computing device finalizes and incorporates the suggested document merge resolution recommendations into the collaborative document. In various embodiments, the document collaboration computing device can render the suggested document merge resolution recommendations on the interactive user interface in various formats to indicate that the suggested document merge resolution recommendations have not yet been incorporated into the collaborative document.

For instance, the document collaboration computing device can render suggested document merge resolution recommendations in the collaborative document in various ways including, but not limited to, displaying the textual content associated with the suggested document merge resolution recommendations in various alternate colors relative to the color of the sequenced textual content rendered on the interactive user interface (e.g., rendering the text associated with the suggested document merge resolution recommendations in blue if the current text is black), applying various emphases to textual content based on the suggested document merge resolution recommendations (e.g., struckthrough text, highlighted text, italicized text, underlined text, bold text, and/or the like), applying various opacities to textual content based on the suggested document merge resolution recommendations (e.g., semi-transparent text to differentiate the suggested document merge resolution recommendations from the sequenced textual content), and/or applying various animations to textual content (e.g., blinking text associated with the suggested document merge resolution recommendations).

Once the suggested document merge resolution recommendations are approved by the client computing device associated with the dominant user via a transmitted confirmation signal, the alternate text formatting based on the suggested document merge resolution recommendations is removed, and the suggested document merge resolution recommendations are incorporated into the collaborative document and rendered on one or more interactive user interfaces as sequenced textual content. The collaborative document is thereby updated and can be updated and/or stored in the document collaboration data repository associated with the document collaboration platform.

The term "user profile passage" refers to a data construct generated by a document collaboration computing device associated with a document collaboration platform. One or more user profiles can be stored in a document collaboration data repository associated with the document collaboration platform, and the one or more user profiles can be associated with one or more respective user profile passages comprising various portions of data related to, but not limited by, one or more user input step events and/or one or more portions of textual content (e.g., one or more sentences, paragraphs, and or pages of textual content) associated with a particular user profile. A user profile passage can be a structured segment of text associated with a particular user profile compiled from a collaborative document, such as, for example, an entire sentence or paragraph. The data comprised in the user profile passages can be data collected by a document collaboration computing device from one or more collaborative documents that a client computing device associated with the user profile has interacted with and/or contributed to.

The terms "computer-readable storage medium" refers to a non-transitory, physical, or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a document collaboration platform and/or server system. The document collaboration platform and/or server system is often (but not always) on another computer system, in which case the client accesses the service by way of a network. Client computing devices may include, without limitation, smart phones, tablet computers, laptop computers, wearables, personal computers, enterprise computers, and the like.

The term "document collaboration computing device" refers to a combination of computer hardware and/or software that is configured to provide a service to a client device. An example of a document collaboration computing device is the document collaboration computing device 106 of FIG. 1. In some embodiments, a document collaboration computing device communicates with one or more client computing devices using one or more computer networks.

As used herein, the terms "data," "content," "textual content," "textual content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems and Apparatuses of the Disclosure

FIG. 1 depicts an exemplary document collaboration platform architecture 100 configured for automatic multiuser input resolution for a collaborative document in accordance with one or more embodiments of the present disclosure. The document collaboration platform architecture 100 comprises client computing device(s) 102*a-n*, a document collaboration platform 104, and/or a document merge resolution system 122. The document collaboration platform 104 also comprises a document collaboration computing device 106. The document collaboration computing device 106 comprises an input step event component 108, a document sequence component 110, a document merge resolution component 112, and/or a document merge model training component 114. The document collaboration platform 104 also includes a document collaboration data repository 116 comprising one or more portions of data associated with the document collaboration platform 104, such as user profile data 118 and collaborative document data 120. The document merge resolution system 122 comprises a document merge manager 124, a document object analyzer 126, and/or document merge model(s) 128.

The client computing device(s) 102*a-n*, the document collaboration platform 104, and the document merge resolution system 122 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, a wireless network 802.11, 802.16, 802.20, and/or WiMAX network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a WebSocket channel. In some embodiments, the protocol is JSON over RPC, JSON over REST/HTTP, and the like Each of the components comprised in the document collaboration platform architecture 100 are configured to work in tandem to facilitate the collaboration of one or more client computing device(s) 102*a-n* associated with one or more respective user profiles such that the one or more client computing device(s) 102*a-n* can simultaneously compose, draft, edit, update, and/or otherwise alter a collaborative document generated and managed by the document collaboration platform 104. Furthermore, each of the components comprised in the document collaboration platform architecture 100 are configured to work in tandem to facilitate the automatic resolution of one or more document conflicts associated with a particular collaborative document.

The input step event component 108 is configured to receive and analyze multi-user input data generated by one or more client computing device(s) 102*a-n*. The multi-user input data can comprise data associated with one or more input commands generated by one or more peripheral input devices capable of manipulating a client computing device. For example, the one or more input commands can be commands issued by a computer mouse, computer keyboard, electronic touchpad, interactive touch display, electronic stylus, and/or the like. The one or more input commands can be directed towards adding, deleting, updating, emphasizing, and/or altering one or more portions of sequenced textual content rendered via an interactive user interface associated with a collaborative document.

The input step event component 108 is configured to generate, based on the multi-user input data, one or more user input step events. For example, a single user input step event can be generated for one keystroke input. Additionally, or alternatively, a single user input step event could be a reformatting of a portion of sequenced textual content (e.g., italicizing the portion of sequenced textual content). In various embodiments, the one or more user input step events can contain various portions of metadata related to, but not limited by, an input step event type (e.g., replace, addText, removeText, addStyle, or removeStyle), an input step event sequence range, a textual content type identifier, one or more portions of textual content data, a user profile identifier, and/or timestamp data associated with the user input step event. The input step event component 108 is configured to transmit the one or more user input step events to the document sequence component 110.

The input step event component 108 can determine, based on one or more respective user profile identifiers associated with the one or more user input step events, a corresponding user profile with which to associate the one or more user input step events. For example, the input step event component 108 can update one or more respective user profiles comprised in the user profile data 118 such that the one or more respective user profiles are associated with the corresponding one or more user input step events. The input step event component 108 is configured to store the one or more user input step events in the document collaboration data repository 116 by, for example, updating the collaborative document data 120 to include the one or more user input step events. The input step event component 108 is also configured to transmit the one or more user input step events to the document merge resolution system 122 for processing and determining one or more document conflicts associated with a particular collaborative document.

The document sequence component 110 is configured to generate sequenced textual content based on one or more user input step events and render the sequenced textual content on one or more interactive user interfaces associated with a collaborative document. For instance, the document sequence component 110 can parse, structure, and/or organize the metadata related to the one or more user input step events associated with one or more user profiles that are simultaneously generating textual content (e.g., text, lists, tables, spreadsheets, flowcharts, and/or the like) for a collaborative document such that the simultaneously generated textual content is correctly organized and rendered as sequenced textual content on one or more respective interactive user interfaces associated with the collaborative document.

The document sequence component 110 is also configured to associate one or more portions of sequenced textual content with one or more respective user profiles based on the user profile identifiers associated with the sequenced textual content. In various embodiments, the document sequence component 110 is also configured to transmit the one or more portions of textual content comprised in the sequenced textual content to the document merge resolution system 122 for processing and determining one or more document conflicts associated with a particular collaborative document.

Furthermore, the document sequence component 110 is configured to generate one or more user profile passages for a user profile based on one or more portions of textual content comprised in the sequenced textual content. User profiles stored in the document collaboration data repository 116 (e.g., stored in the user profile data 118) can be associated with one or more respective user profile passages comprising various portions of data related to, but not limited by, one or more user input step events and/or one or more portions of textual content (e.g., one or more sentences, paragraphs, and or pages of textual content) associated with a particular user profile. A user profile passage can be a structured segment of text associated with a particular user profile compiled from a collaborative document, such as, for example, an entire sentence or paragraph.

The document merge resolution component 112 is configured to receive one or more document merge resolutions generated by a document merge model (e.g., document merge model(s) 128) for one or more user profiles associated with a collaborative document. The one or more document merge resolutions can comprise, but are not limited to, one or more textual content deletion resolutions, one or more textual content merging resolutions, one or more document item resequencing resolutions, and/or one or more textual content markup resolutions.

In various circumstances, the one or more document merge resolutions generated by the document merge model can be document merge resolutions that are combinations of one or more textual content deletion resolutions, one or more textual content merging resolutions, one or more document item resequencing resolutions, and/or one or more textual content markup resolutions. The one or more document merge resolutions can be generated in response to one or more document conflicts detected in the collaborative document by the document merge model(s) 128. Document conflicts can comprise, but are not limited to, a duplicate textual content conflict, a duplicate subject matter conflict, a document item sequencing conflict, and/or a document markup conflict.

The document merge resolution component 112 is configured to generate one or more suggested document merge resolution recommendations to address the one or more document conflicts in the collaborative document based on the one or more document merge resolutions. The document merge resolution component 112 can render the suggested document merge resolution recommendations on one or more interactive user interfaces associated with the collaborative document. In some embodiments, the suggested document merge resolution recommendations are only rendered on an interactive user interface associated with a client computing device (e.g., client computing device 102*a*) related to a user profile designated as a dominant user. The dominant user is associated with a user profile responsible for generating a majority of the textual content related to the one or more document conflicts related to the suggested document merge resolution recommendation. In other embodiments the suggested document merge resolution recommendation is rendered on the two or more client computing devices 102*a-n* generating textual content for the collaborative document, however the one or more client computing devices 102*a-n* that aren't designated at the dominant user are only able to see "read-only" versions of the textual content associated with the suggested document merge resolution recommendation.

A client computing device associated with the dominant user profile (e.g., client computing device 102*a*) can transmit a confirmation signal to the document collaboration computing device in order to approve or deny the incorporation of the one or more suggested document merge resolution recommendations into the collaborative document. If the client computing device transmits a confirmation signal approving the incorporation of the one or more suggested document merge resolution recommendations, the document merge resolution component 112 finalizes and incorporates the one or more suggested document merge resolution recommendations into the collaborative document. In various embodiments, the document merge resolution component 112 can render the one or more suggested document merge resolution recommendations on the interactive user interface in various formats to indicate that the one or more suggested document merge resolution recommendations have not yet been incorporated into the collaborative document.

For instance, the document merge resolution component 112 can render the one or more suggested document merge resolution recommendations in the collaborative document in various ways including, but not limited to, displaying the textual content associated with the suggested document merge resolution recommendations in various alternate colors relative to the color of the sequenced textual content rendered on the interactive user interface (e.g., rendering the text associated with the suggested document merge resolution recommendations in blue if the current text is black), applying various emphases to textual content based on the suggested document merge resolution recommendations (e.g., struck-through text, highlighted text, italicized text, underlined text, bold text, and/or the like), applying various opacities to textual content based on the suggested document merge resolution recommendations (e.g., semi-transparent text to differentiate the suggested document merge resolution recommendations from the sequenced textual content), and/or applying various animations to textual content (e.g., blinking text associated with the suggested document merge resolution recommendations).

Once the one or more suggested document merge resolution recommendations are approved by the client computing device (e.g., client computing device 102*a*) via a transmitted confirmation signal, the alternate text formatting based on the suggested document merge resolution recommendations is removed, and the suggested document merge resolution recommendations are incorporated into the collaborative document and rendered on one or more interactive user interfaces as sequenced textual content. In circumstances in which the one or more suggested document merge resolution recommendations are approved, the document merge resolution component 112 is configured to store the updated collaborative document in the document collaboration data repository 116 (e.g., in the collaborative document data 120).

The document merge model training component 114 is configured to generate, train, and/or retrain one or more document merge models (e.g., document merge model(s) 128) for the document merge resolution system 122. In various embodiments, the one or more document merge model(s) 128 can be machine learning models configured based on an artificial neural network (ANN) (e.g., such as a transformer model), a recurrent neural network (RNN) (e.g., such as a sequence-to-sequence model), a convolutional neural network (CNN), a natural language processing (NLP) model, and/or any other relevant deep learning model configured to employ artificial intelligence and/or machine reasoning to generate document merge resolutions based on model input provided by a document collaboration computing device 106.

One or more document merge model(s) 128 can be trained based on one or more portions of data comprised in a document collaboration data repository 116 associated with a particular document collaboration platform 104. For example, a document merge model 128 can be trained based in part on one or more collaborative documents stored by a particular document collaboration platform 104, where the one or more collaborative documents comprise one or more user profile passages associated with one or more respective user profiles associated with the particular document collaboration platform 104. The document merge resolutions generated by a document merge model 128 trained based in part on the one or more collaborative documents can reflect an enterprise merge resolution style reflecting a defined presentation style associated with a particular company, enterprise, and/or other organizational structure. In this regard, textual content can be generated to reflect the lexicon, preferred writing style, history, values, mission, objectives, goals, and/or public-facing persona associated with the particular company, enterprise, and/or other organizational structure as a result of automatically resolving one or more document conflicts within a collaborative document.

Additionally and/or alternatively, the document merge model(s) 128 can be a neural language model trained based in part on a global corpus of documents scraped from the Internet and can generate document merge resolutions based on the contents of the global corpus of documents in response to receiving model input associated with the collaborative document from the document collaboration computing device 106.

The document merge resolution system 122 works in conjunction with the document collaboration platform 104 to generate one or more suggested document merge resolution recommendations to address one or more document conflicts in a collaborative document. In various embodiments, the document merge resolution system 122 is remote from the document collaboration platform 104 and communicates with the document collaboration platform 104 via one or more networks. In various other embodiments, the document merge resolution system 122 can be embodied by the document collaboration platform 104.

The document merge resolution system 122 is configured to receive one or more portions of data from the document collaboration computing device 106 including, but not limited to, one or more user input step events, one or more portions of textual content, one or more user profile passages, one or more portions of user profile data 118, and/or one or more portions of collaborative document data 120. The document merge resolution system 122 is also configured to receive one or more portions of metadata associated with a particular collaborative document such as metadata associated with a relative position of a dynamic text insertion cursor associated with a particular user profile within the collaborative document.

The document merge manager 124 is configured to ingest one or more user input step events that have been enqueued into in an event processing queue and/or one or more portions of metadata (e.g., one or more user profile identifiers) associated with a particular collaborative document as one or more client computing device(s) 102*a-n* associated with one or more respective user profiles are simultaneously generating textual content for the particular collaborative document. The document merge manager 124 is configured to generate collaborator metadata from the one or more user input step events and/or the collaborative document. The collaborator metadata can comprise metadata including, but not limited to, one or more user profiles, a document position associated with one or more dynamic text insertion cursors associated with a respective user profile, and/or other metadata associated with the one or more user profiles.

The document merge manager 124 is also configured to generate a document object representative of the particular collaborative document based on the contents of the event processing queue and the metadata associated with the particular collaborative document and the document merge manager 124 continues to incrementally build the document object as more user input step events are added to the event processing queue. In this way, the document merge manager 124 has a real-time state of the particular collaborative document and the current positions of the one or more dynamic text insertion cursors related to the one or more respective user profiles associated with the one or more client computing device(s) 102*a-n* that are simultaneously generating textual content for the particular collaborative document. Additionally, the document object can comprise one or more user profile passages associated with one or more user profiles related to the collaborative document. The document merge manager 124 is configured to send the document object to the document object analyzer 126.

The document object analyzer 126 is configured to determine whether the entire document object should be used as model input for the document merge model(s) 128 or whether one or more portions of the document object (e.g., one or more portions of textual content and/or one or more user profile passages comprised in the collaborative document) should be used as model input for the document merge model(s) 128. For example, if the size of the document object surpasses a predefined document size threshold, the document object analyzer 126 can determine to parse a predefined portion of textual content comprised in the document object that is associated with sequenced textual content relative to the position of a dynamic text insertion cursor on the interactive user interface associated with the collaborative document, where the dynamic text insertion cursor indicates a relative typing position associated with a particular user profile.

For example, if client computing devices 102*a* and 102*b* are simultaneously generating text in a collaborative document, document merge manager 124 can incrementally build a document object representative of the collaborative document. The document object analyzer 126 can analyze the document object to parse a portion of textual content associated with sequenced textual content representing entire sentence stems immediately preceding the respective dynamic text insertion cursors related to the user profiles associated with the client computing devices 102*a* and 102*b*. The document object analyzer 126 can then transmit said portion of textual content to the document merge model(s) 128 to be used as model input. In various embodiments, the size of the portion of textual content to be used as model input can be a predefined number of words, sentences, paragraphs, pages, and/or the like relative to the position of the dynamic text insertion cursor.

The document merge model(s) 128 can be machine learning models configured based on an artificial neural network (ANN) (e.g., such as a transformer model), a recurrent neural network (RNN) (e.g., such as a sequence-to-sequence model), a convolutional neural network (CNN), a natural language processing (NLP) model, and/or any other relevant deep model configured to employ artificial intelligence and/or machine reasoning to generate document merge resolutions based on model input, where the model input can be a document object generated by the document merge manager 124 in response to receiving one or more user input step events, one or more portions of textual content, and/or one or more user profile passages provided by a document collaboration computing device 106.

The document merge model(s) 128 can be trained and configured to determine one or more document conflicts associated with a particular collaborative document based on the document object generated by the document merge manager 124. Document conflicts can comprise, but are not limited to, a duplicate textual content conflict, a duplicate subject matter conflict, a document item sequencing conflict, and/or a document markup conflict. A duplicate textual content conflict can be a situation in which two or more client computing devices 102*a-n* associated with two or more respective user profiles have generated two or more portions of textual content that are the same or similar. In various embodiments, a document merge model 128 can apply various neural language processing algorithms in order to detect when two or more portions of textual content are similar, but not quite the same. The document merge model can generate one or more document merge resolutions to address the duplicate textual content conflict, such as, for example, a recommendation to delete the portion of textual content comprising the duplicated textual content.

A duplicate subject matter conflict can be a situation in which two or more client computing devices 102*a-n* associated with two or more respective user profiles have generated one or more portions of textual content that are directed towards the same subject matter. While the two or more portions of textual content may not use the exact same language, the document merge model can detect that the two or more portions of textual content are directed towards the same subject matter, and generate document merge resolutions that comprise merging, editing, and or updating the two or more portions of textual content.

A document item sequencing conflict can be a situation in which two or more client computing devices 102*a-n* associated with two or more respective user profiles are generating numbered or alphabetized lists in a collaborative document and a client computing device of the two or more client computing devices 102*a-n* generates a list item with a duplicate number or letter. The document merge model can detect the sequencing or alphabetizing conflict and generate a document merge resolution to correctly sequence the numbered or alphabetized list. In some embodiments, the document merge model can automatically update the collaborative document such that the numbered or alphabetized list is correctly sequenced without intervention by the two or more client computing devices 102*a-n*.

Additionally or alternatively, a document item sequencing conflict can be a situation in which two or more list items comprised in a numbered or alphabetized list in a collaborative document comprise two or more portions of textual content that are the same or similar, and/or are directed towards the same subject matter. The document merge model 128 can determine that one or more list items need to be deleted, updated, merged, and/or combined.

A document markup conflict can be a situation in which two or more client computing devices 102*a-n* associated with two or more respective user profiles are simultaneously formatting one or more portions of sequenced textual content. For example, a first client computing device 102*a* associated with a first user profile may have formatted a portion of sequenced textual content to italicized and a second client computing device 102*b* associated with a second user profile may have formatted the same portion of sequenced textual content to have a bold emphasis. The document merge model can determine that an exclusive merge resolution should be made such that either the italic formatting or the bold formatting should be removed. Alternatively, the document merge model can determine that an additive merge resolution should be made such that both the italic and bold formats should be applied to the textual content.

As another example of a document markup conflict, the first client computing device 102*a* associated with the first user profile may have changed a portion of sequenced textual content to a first color (e.g., blue) and the second client computing device 102*b* associated with the second user profile may have changed the same portion of sequenced textual content to a second color (e.g., red). The document merge model can determine that an exclusive merge resolution should be made such that said portion of sequenced textual content should be red or blue.

The document merge model(s) 128 can also be trained and configured to generate one or more document merge resolutions based on one or more document conflicts associated with the collaborative document. The document merge model(s) 128 are configured to receive one or more portions of a document object generated by a document merge manager 124 associated with a document merge resolution system 122 and one or more portions of metadata associated with the collaborative document (e.g., collaborator metadata) as model input. Based on the document object and the one or more portions of metadata associated with the collaborative document, the document merge model(s) 128 are configured to detect one or more document conflicts and automatically generate one or more document merge resolutions.

The document object representing the collaborative document is built incrementally by the document merge manager 124 based on the simultaneous contributions of the two or more client computing devices 102*a-n* generating textual content for the collaborative document. As such, the model input sequence and subsequent model output sequence executed by the document merge model(s) 128 can be understood by the following simplified method: predict(X, XA, XB)=Y.

In this method, X can be understood as a baseline input sequence representing the textual content associated with the collaborative document and comprised in the document object. XA can be understood as the modifications on X by a first user profile A that are comprised in the document object, and XB can be understood as the modifications on X by a second user profile B that are comprised in the document object. Finally, the output sequence Y can be understood as the one or more document merge resolutions generated by the document merge model(s) 128 based on the inputs X, XA, and XB.

The one or more document merge resolutions are generated to address the one or more document conflicts. The one or more document merge resolutions can comprise, but are not limited to, one or more textual content deletion resolutions, one or more textual content merging resolutions, one or more document item resequencing resolutions, and/or one or more textual content markup resolutions. In various circumstances, the document merge model(s) 128 can generate one or more document merge resolutions that are combinations of one or more textual content deletion resolutions, one or more textual content merging resolutions, one or more document item resequencing resolutions, and/or one or more textual content markup resolutions.

A textual content deletion resolution can be a resolution to delete one or more portions of textual content generated for a collaborative document by one or more client computing devices 102*a-n* associated with one or more respective user profiles. A document item resequencing resolution can be a resolution to eliminate and/or re-sequence a numbered or alphabetized one or more list items with erroneous numbering or alphabetization. In some embodiments, the document merge model(s) 128 can automatically update and/or re-sequence a numbered or alphabetized list comprising sequencing errors without intervention (e.g., a confirmation signal) by the two or more client computing devices 102*a-n* generating the numbered or alphabetized list. Additionally or alternatively, a document item resequencing resolution can be a resolution to delete, update, merge, and/or combine two or more list items that comprise two or more portions of textual content that are the same or similar, and/or are directed towards the same subject matter.

A textual content merging resolution can be a resolution to merge and/or combine two or more portions of textual content in a collaborative document. For example, if the document merge model(s) 128 detect a duplicate subject matter conflict in which two or more user profile passages in a collaborative document are directed to the same or similar subject matter, the document merge model(s) 128 can merge and/or combine the two or more user profile passages. In circumstances where two or more user profile passages in a collaborative document are merged and/or combined, a third user profile passage can be generated and the two or more user profile passages that were merged and/or combined can be deleted such that collaborative document remains structured, organized, and logical.

A textual content markup resolution can be a resolution to remove or merge two or more types of text markup formatting for a particular portion of sequenced textual content. For example, if the document merge model(s) 128 detect a document markup conflict in which a particular portion of sequenced textual content has been formatted in various way by two or more client computing devices 102*a-n*, the document merge model can determine whether to remove one or more of the various text markup formats or combine the text markup formats. In circumstances in which the text markup can't be combined (e.g., if two client computing devices have both attempted to change the color of the sequenced textual content) the document merge model(s) 128 can determine which text markup change will be prioritized. When appropriate, the document merge model can determine that the two or more types of text markup formatting should be merged. For example, if a first client computing device attempts to italicize a portion of sequenced textual content while a second client computing device attempts to bolden the same portion of sequenced textual content.

The document merge model(s) 128 can calculate a merge resolution confidence score for each of the one or more document merge resolutions. In various embodiments, the merge resolution confidence score can be derived based on previously generated document merge resolutions that were associated with positive confirmation signals.

For example, in scenarios where the merge resolution confidence score associated with a particular document merge resolution satisfies a predefined document merge resolution threshold, the document merge resolution generated by the document merge model(s) 128 can be automatically incorporated into the collaborative document. If a client computing device (e.g., client computing device 102*a-n*) does not revert the automatically incorporated document merge resolution, the document collaboration computing device 106 can transmit a positive confirmation signal to the document merge resolution system 122. As such, the positive confirmation signal associated with the automatically incorporated document merge resolution can be employed to refine the document merge model(s) 128 to better calculate future merge resolution confidence scores for future document merge resolutions associated with one or more future document conflicts.

Alternatively, if a particular document merge resolution is associated with a merge resolution confidence score below the predefined document merge resolution threshold, a suggested document merge resolution recommendation associated with the particular document merge resolution generated by the document merge model(s) 128 can be presented via one or more interactive user interfaces associated with the collaborative document thereby prompting the end user to affirmatively or negatively confirm the incorporation of the suggested document merge resolution recommendation into the collaborative document. The positive and/or negative confirmation signals respectively approving and/or rejecting the incorporation of the suggested document merge resolution recommendations can be employed to refine the document merge model(s) 128 to better calculate future merge resolution confidence scores for future document merge resolutions associated with one or more future document conflicts.

In one or more embodiments, the document merge model(s) 128 can determine a dominant user associated with one or more suggested document merge resolution recommendations generated based on one or more document conflicts. The document merge model can determine the dominant user based on one or more pieces of metadata comprised in the document object as well as one or more portions of collaborator metadata that were used as model input. The dominant user can be an end user related to a user profile associated with a client computing device that generated a majority of the textual content corresponding to one or more document conflicts associated with the one or more suggested document merge resolution recommendations.

For example, if two client computing devices 102*a-n* associated with two respective user profiles are simultaneously generating textual content for a collaborative document and a document conflict arises, the document merge model 128 can determine which of the two user profiles takes priority for making decisions regarding the incorporation of one or more suggested document merge resolution recommendations into the collaborative document. In an instance in which a document merge resolution is assigned a merge resolution confidence score below the predefined document merge resolution threshold, the document merge resolution will not be automatically incorporated into the collaborative document.

In such a case, the dominant user can be presented with a suggested document merge resolution recommendation corresponding to the document conflict via an interactive user interface associated with the collaborative document (e.g., by way of the document merge resolution component 112). The dominant user can issue a positive confirmation signal or a negative confirmation signal respectively approving or rejecting the incorporation of the suggested document merge resolution recommendation into the collaborative document. The confirmation signal, whether positive or negative, can be used to retrain and/or refine the document merge model(s) 128 such that the document merge model(s) 128 are iteratively updated to increase the accuracy of document merge resolutions over time.

In various embodiments, one or more dominant users can be identified during a single collaborative editing session. For instance, a first user profile associated with a first client computing device (e.g., client computing device 102*a*) can be designated as the dominant user in an instance in which a document conflict arises that corresponds to a first user profile passage associated with the first user profile. Likewise, a second user profile associated with a second client computing device (e.g., client computing device 102*b*) can be designated as the dominant user in an instance in which a document conflict arises that corresponds to a second user profile passage associated with the second user profile.

In various embodiments, any client computing device of the two or more client computing devices 102*a-n* generating textual content for the collaborative document that is not identified as the dominant user will not be able to transmit confirmation signals corresponding to suggested document merge resolution recommendations generated based on the one or more document conflicts. In some embodiments, the suggested document merge resolution recommendations associated with the dominant user will only be displayed via an interactive user interface rendered by the client computing device associated with the dominant user (e.g., client computing device 102*a*). In other embodiments, the suggested document merge resolution recommendations can be rendered for the other client computing devices 102*a-n* that are not associated with the dominant user as "read-only" textual content and/or textual markup.

One or more document merge model(s) 128 can be trained based on one or more portions of data comprised in a document collaboration data repository 116 associated with a particular document collaboration platform 104. For example, a document merge model 128 can be trained based in part on one or more collaborative documents stored by a particular document collaboration platform 104, where the one or more collaborative documents comprise one or more user profile passages associated with one or more respective user profiles associated with the particular document collaboration platform 104. The document merge resolutions generated by a document merge model 128 trained based in part on the one or more collaborative documents can reflect an enterprise merge resolution style reflecting a defined presentation style associated with a particular company, enterprise, and/or other organizational structure. In this regard, textual content can be generated to reflect the lexicon, preferred writing style, history, values, mission, objectives, goals, and/or public-facing persona associated with the particular company, enterprise, and/or other organizational structure as a result of automatically resolving one or more document conflicts within a collaborative document.

Additionally and/or alternatively, the document merge model 128 can be a neural language model trained based in part on a global corpus of documents scraped from the Internet and can generate document merge resolutions based on the contents of the global corpus of documents in response to receiving model input associated with the collaborative document from the document collaboration computing device 106.

Figure 2:
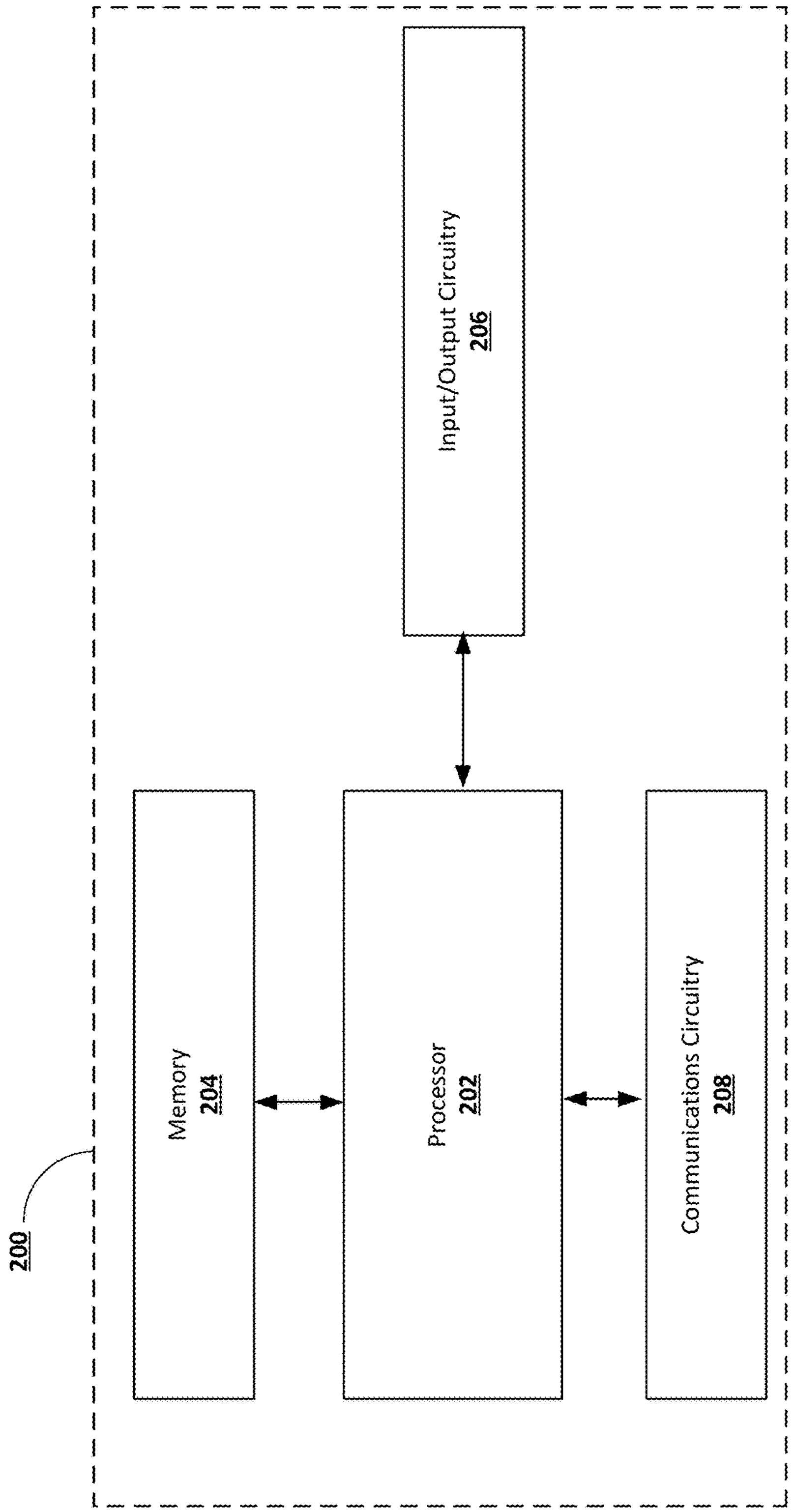
FIG. 2 is a block diagram of an exemplary document collaboration computing device structured in accordance with one or more embodiments of the present disclosure.

FIG. 2 illustrates a block diagram 200 of an exemplary document collaboration computing device 106 structured in accordance with one or more embodiments of the present disclosure. The document collaboration computing device 106 may be embodied by one or more computing systems. The document collaboration computing device 106 may include processor 202, memory 204, input/output circuitry 206, and communications circuitry 208. The document collaboration computing device 106 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the document collaboration computing device 106 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the document collaboration computing device 106. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of document collaboration computing device 106. In some embodiments, one or more external systems (such as a remote cloud computing and/or data storage system) may also be leveraged to provide at least some of the functionality discussed herein.

Figure 3:
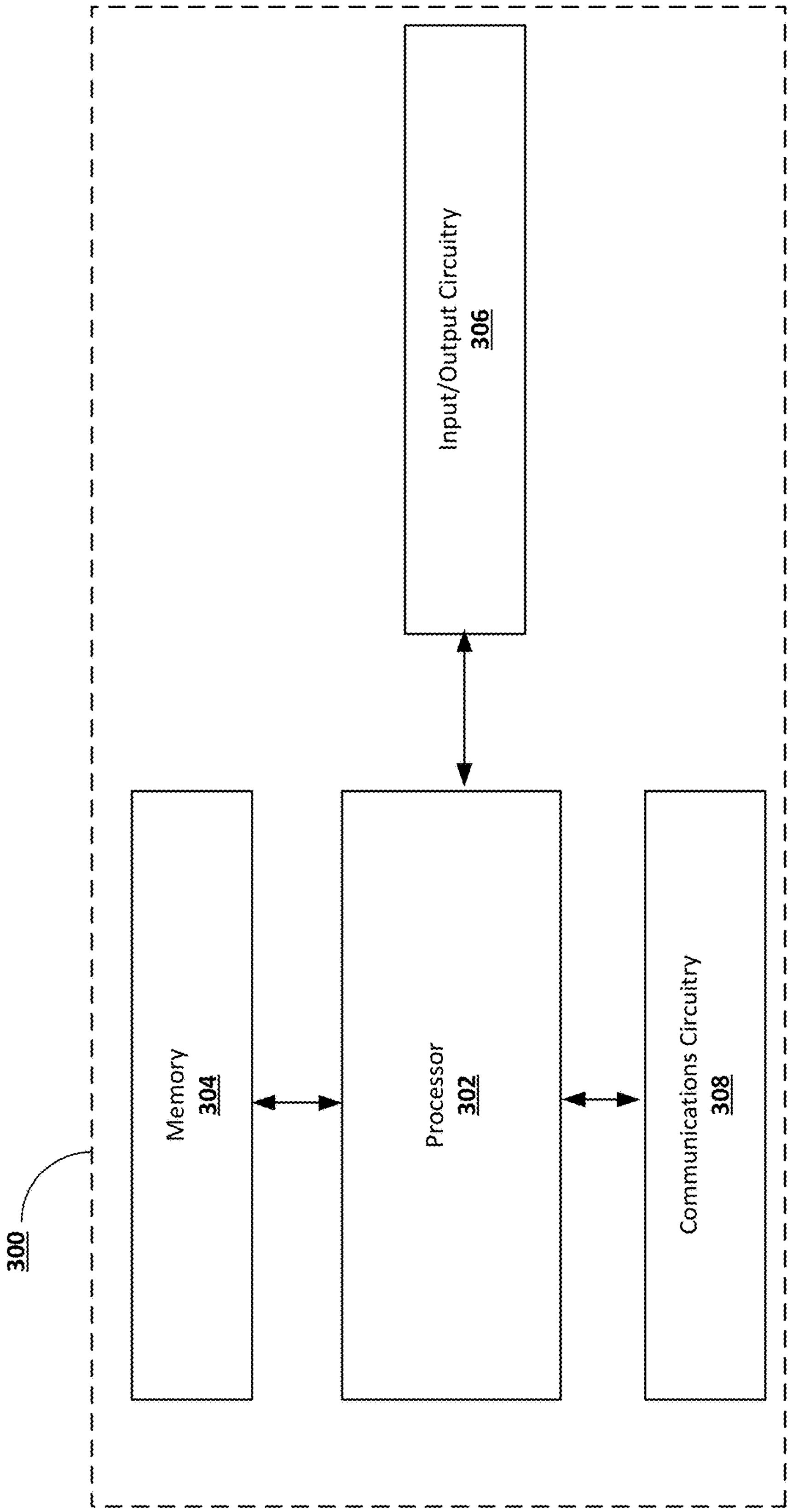
FIG. 3 is a block diagram of an exemplary client computing device structured in accordance with one or more embodiments of the present disclosure.

FIG. 3 illustrates a block diagram 300 of exemplary client computing device(s) 102*a-n* structured in accordance with one or more embodiments of the present disclosure. The client computing device(s) 102*a-n* may be embodied by one or more computing systems. The client computing device(s) 102*a-n* may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the client computing device(s) 102*a-n* to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the client computing device(s) 102*a-n* may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the client computing device(s) 102*a-n* are embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the client computing device(s) 102*a-n*. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of client computing device(s) 102*a-n*. In some embodiments, one or more external systems (such as a remote cloud computing and/or data storage system) may also be leveraged to provide at least some of the functionality discussed herein.

Example Data Flows of the Disclosure

Figure 4:
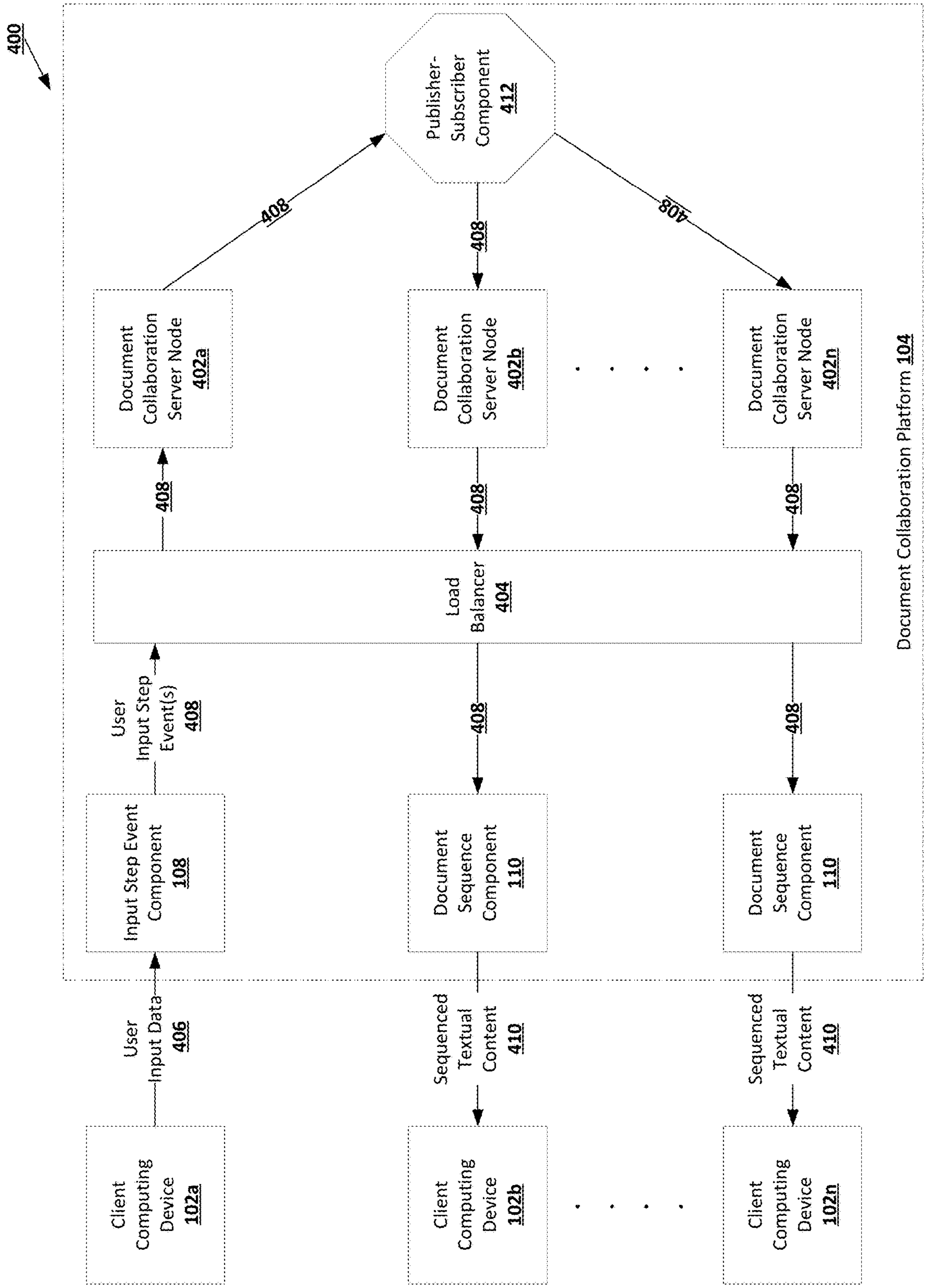
FIG. 4 illustrates an exemplary data flow diagram for one or more client computing devices simultaneously generating textual content for a collaborative document in accordance with one or more embodiments of the present disclosure.

FIG. 4 illustrates a data flow diagram 400 for one or more client computing device(s) 102*a-n* simultaneously generating textual content for a collaborative document in accordance with one or more embodiments of the present disclosure. Specifically, the data flow diagram 400 depicts how the flow of multi-user input data 406 from client computing device 102*a* to the document collaboration platform 104 is subsequently transformed into user input step event(s) 408, and ultimately transformed into sequenced textual content

410 to be broadcast and rendered on the client computing device(s) 102*a-n* via one or more respective interactive user interfaces associated with the collaborative document. In order for multiple client computing device(s) 102*a-n* associated with multiple respective user profiles to collaborate successfully on the same collaborative document, each interactive user interface associated with the collaborative document rendered on the respective client computing device(s) 102*a-n* must display the same document state, and each contribution from the respective user profiles must be incorporated into the collaborative document in sequence.

When one or more client computing device(s) 102*a-n* initiate a collaborative editing session for a particular collaborative document, one or more low-latency communication protocols can be employed to establish one or more low-latency communication connections with the document collaboration platform 104. The low-latency communication connections are used to facilitate communication between the one or more client computing device(s) 102*a-n* and the document collaboration platform 104. In some scenarios, one or more document collaboration server node(s) 402*a-n* associated with the document collaboration platform 104 can be employed to establish a low-latency communication connection with the one or more respective client computing device(s) 102*a-n*. It will be appreciated that the document collaboration platform 104 can be configured to use one or more low-latency communications protocols to maintain a near real-time connection with one or more client computing device(s) 102*a-n*. Some non-limiting examples of low-latency communications protocols that can be utilized by the document collaboration platform 104 include communications protocols that employ WebSocket, Web Transport, HTTP Long Polling, and/or Web Real-Time Communication (WebRTC) techniques.

As illustrated in FIG. 4, client computing device 102*a* can transmit one or more portions of multi-user input data 406 to the input step event component 108 associated with the document collaboration platform 104. The multi-user input data 406 can comprise data associated with one or more input commands generated by one or more peripheral input devices capable of manipulating the client computing device 102*a* (e.g., via input/output circuitry 306). For example, the one or more input commands can be commands issued by a computer mouse, computer keyboard, electronic touchpad, interactive touch display, electronic stylus, and/or the like.

It will be appreciated that when one or more client computing device(s) 102*a-n* are simultaneously generating textual content for the collaborative document during the collaborative editing session, the one or more client computing device(s) 102*a-n* can simultaneous generate multi-user input data 406 to be processed and broadcast as one or more user input step event(s) 408, and ultimately transformed into sequenced textual content 410 to be rendered in near real time on each of the respective interactive user interfaces associated with the one or more client computing device(s) 102*a-n* engaged in the collaborative editing session.

Figure 9A:
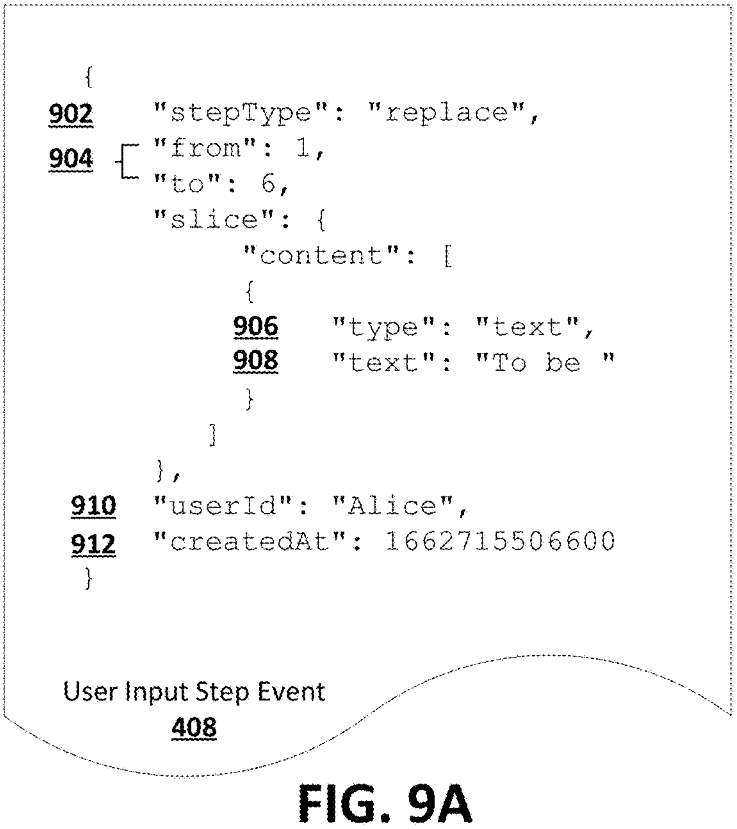
FIGS. 9A-B provide operational examples of user input step events associated with a collaborative document in accordance with one or more embodiments of the present disclosure.
Figure 9B:
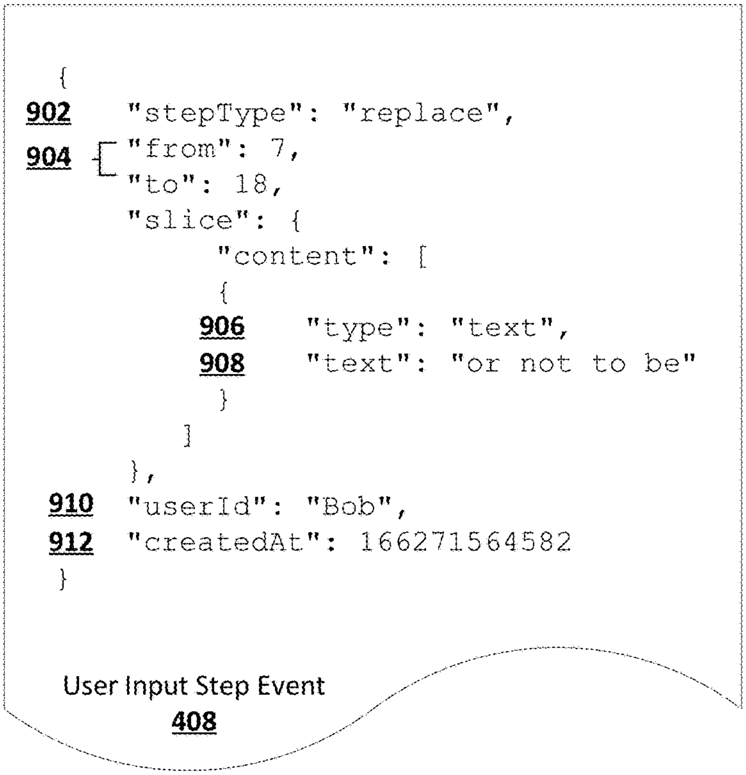

The input step event component 108 is configured to generate, based on the multi-user input data 406, one or more user input step event(s) 408. Referencing FIGS. 9A-B, two operational examples are provided representing the one or more user input step event(s) 408 generated based on the multi-user input data 406 generated by two client computing devices (e.g., client computing devices 102*a* and 102*b* respectively) while simultaneously generating text for a collaborative document. In various embodiments, the one or more user input step event(s) 408 can contain various portions of metadata related to, but not limited by, an input step event type 902, an input step event sequence range 904, a textual content type identifier 906, one or more portions of textual content data 908, a user profile identifier 910, and/or timestamp data 912 associated with the user input step event(s) 408. FIG. 9A illustrates a user input step event 408 generated based on multi-user input data 406 from a client computing device (e.g., client computing device 102*a*) associated with a user profile with a user profile identifier 910 of "Alice." FIG. 9B illustrates a user input step event 408 generated based on multi-user input data 406 from a client computing device (e.g., client computing device 102*b*) associated with a user profile with a user profile identifier 910 of "Bob."

In an instance where two client computing devices associated with two respective user profiles are simultaneously generating text in a new collaborative document (e.g., client computing device(s) 102*a* and 102*b* associated with user profiles Alice and Bob respectively), and the first client computing device 102*a* generates multi-user input data 406 correlating to the words "To be" and the second client computing device 102*b* generates multi-user input data 406 correlating to the words "or not to be" the input step event component 108 can generate user input step event(s) 408 associated with the multi-user input data 406 generated by the two client computing devices 102*a* and 102*b* respectively. In one example scenario, the first client computing device 102*a* could have generated the multi-user input data 406 "To be" before the second client computing device 102*b* began generating the second client computing device's respective multi-user input data 406 "or not to be."

In such a scenario, the input step event component 108 can generate a user input step event 408 comprising metadata associated with the multi-user input data 406 generated by the first client computing device 102*a* such that the metadata associated with the input step event sequence range 904 reflects an ordered number of document positions within the collaborative document, where each character corresponding to each keyboard entry (including spaces) is associated with an integer value associated with a respective document position. In this example, the input step event sequence range 904 would be 1-6, one document position per each keystroke used to generate the text "To be" in the collaborative document. In this scenario, the second client computing device 102*b* would have generated the multi-user input data 406 corresponding to the text "or not to be" and the input step event component 108 would have generated a user input step event 408 with metadata corresponding to an input step event sequence range 904 of 7-18.

The document sequence component 110 can organize the user input step event(s) 408 generated by the input step event component 108 based on the respective input step event sequence range(s) 904 and/or timestamp data 912 associated with the user input step event(s) 408 to generate sequenced textual content 410 for rendering on the one or more interactive user interfaces associated with the respective client computing device(s) 102*a-n* simultaneously generating textual content for the collaborative document. In this example, the resulting sequenced textual content 410 generated and rendered by the document collaboration platform 104 would be "To be or not to be".

However, it will be appreciated that when two client computing devices (e.g., client computing devices 102*a* and 102*b*) are simultaneously generating textual content for a collaborative document, the two client computing devices may generate multi-user input data 406 at the same time. In such cases, the input step event component 108 may generate user input step event(s) 408 comprising input step event sequence range(s) 904 that are short, and therefore comprise short, disjointed textual content. However, because of the input step event sequence range 904 metadata and the corresponding timestamp data 912, the document sequence component 110 is able to stitch the user input step event(s) 408 together to generate sequenced textual content 410 that is structured and organized. One or more user input step event(s) 408 can be stored in a document collaboration data repository 116 associated with the document collaboration platform 104. In one or more embodiments, one or more user input step event(s) 408 can be associated with one or more respective user profiles stored in the document collaboration data repository 116 based on the user profile identifier(s) 910 comprised in the one or more user input step event(s) 408.

Returning now to FIG. 4, the user input step event(s) 408 are transmitted to a load balancer 404. The load balancer 404 is configured for sequencing the incoming and outgoing data associated with the collaborative document such as, for example, the one or more user input step event(s) 408 being generated simultaneously by the client computing device(s) 102*a-n*. The user input step event(s) 408 are transmitted to the respective document collaboration server node 402*a* that has established the low-latency communication connection with the client computing device 102*a*. The document collaboration server node 402*a* then transmits the one or more user input step event(s) 408 to publisher-subscriber component 412.

The publisher-subscriber component 412 is configured to receive one or more user input step event(s) 408 related to a particular collaborative document from a client computing device (e.g., client computing device 102*a*) and broadcast the one or more user input step event(s) 408 to one or more respective document collaboration server node(s) (e.g., document collaboration server node(s) 402*b-n*). The one or more respective collaboration server node(s) transmit, by way of the load balancer 404, the one or more user input step event(s) 408 to the document sequence component 110. The document sequence component 110 is configured to generate sequenced textual content 410 based on the one or more user input step event(s) 408 and render the sequenced textual content 410 on the one or more interactive user interfaces associated with the one or more other respective client computing devices currently generating textual content for the same particular collaborative document (e.g., client computing device(s) 102*b-n*). In this manner, each of the client computing device(s) 102*a-n* can view any updates and/or new contributions to the collaborative document made by any of the other client computing device(s) 102*a-n* in near real time.

Figure 5:
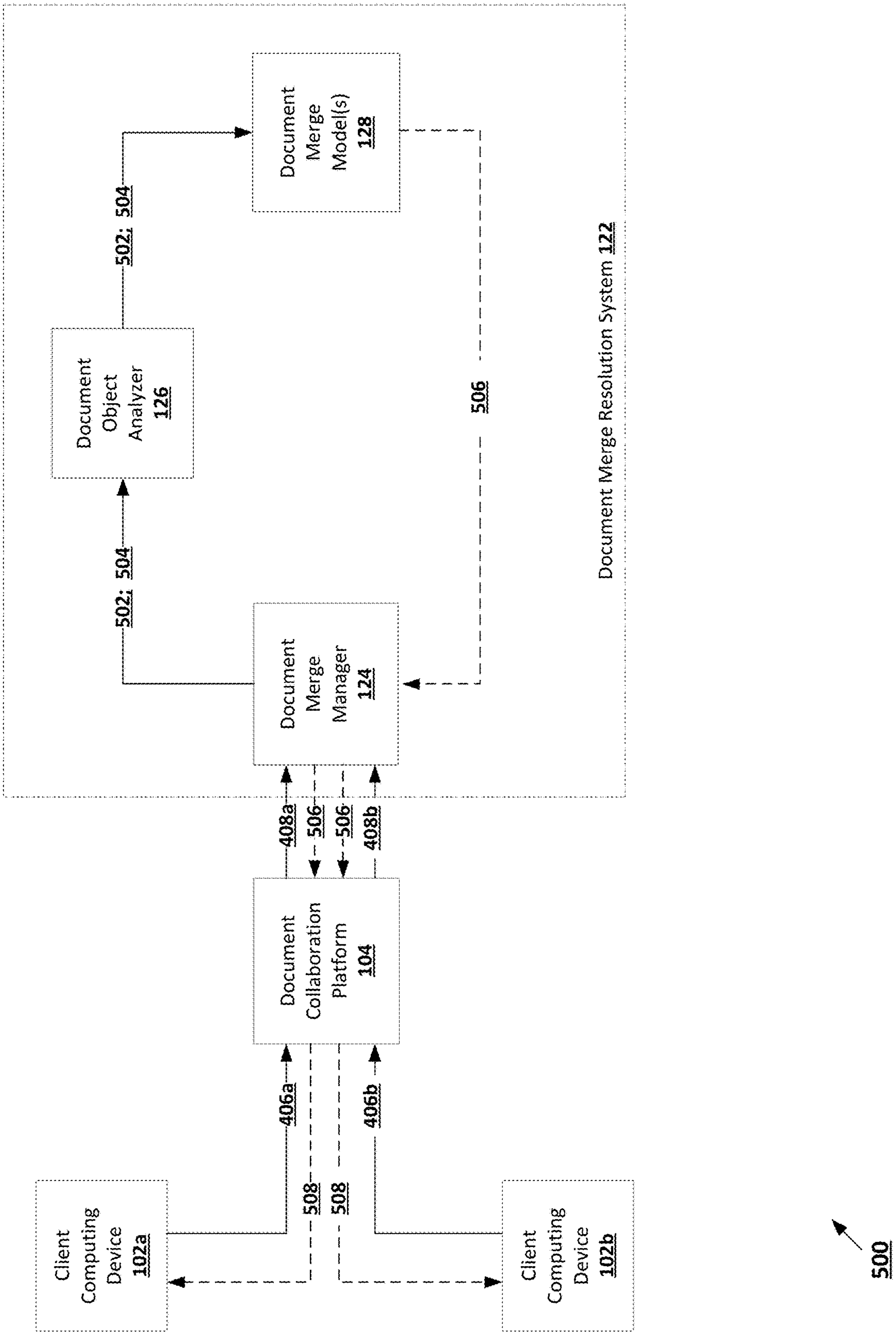
FIG. 5 illustrates an exemplary document merge resolution system architecture configured for generating suggested document merge resolution recommendations in accordance with one or more embodiments of the present disclosure.

FIG. 5 illustrates exemplary document merge resolution system architecture 500 which is configured for generating document merge resolutions in accordance with one or more embodiments of the present disclosure. Specifically, FIG. 5 illustrates an exemplary data flow between multiple client computing device(s) 102*a* and 102*b*, a document collaboration platform 104, and a document merge resolution system 122.

While FIG. 5 only depicts two client computing devices simultaneously generating textual content for a collaborative document via the document collaboration platform 104, it will be appreciated that similar methods can be used to accommodate three or more client computing device(s) 102*a-n* and suggested document merge resolution recommendations can be generated for three or more user profiles associated with each of the three or more respective client computing device(s) 102*a-n*.

The client computing device 102*a* can be associated with a user profile (e.g., by user profile identifier 910) "Alice" and can transmit multi-user input data 406*a* to the document collaboration platform 104. The document collaboration platform 104 can generate one or more user input step event(s) 408*a* based on the multi-user input data 406*a* and can transmit the one or more user input step event(s) 408*a* (e.g., by way of the document collaboration computing device 106) to the document merge resolution system 122. Simultaneously, the client computing device 102*b* associated with a different user profile "Bob" can transmit multi-user input data 406*b* to the document collaboration platform 104 and the document collaboration platform 104 can generate one or more user input step event(s) 408*b* based on the multi-user input data 406*b* and transmit the one or more user input step event(s) 408*b* to the document merge resolution system 122.

The document merge resolution system 122 is configured to receive one or more portions of data from the document collaboration computing device 106 including, but not limited to, one or more user input step events, one or more portions of textual content, one or more user profile passages, one or more portions of user profile data 118, and/or one or more portions of collaborative document data 120. The document merge resolution system 122 is also configured to receive one or more portions of metadata associated with a particular collaborative document such as metadata associated with a relative position of a dynamic text insertion cursor associated with a particular user profile (e.g., Alice) within the collaborative document, where the dynamic text insertion cursor indicates a relative typing position associated with the particular user profile.

The document merge manager 124 is configured to ingest one or more user input step event(s) 408 that have been enqueued into in an event processing queue and/or one or more portions of metadata (e.g., one or more user profile identifier(s) 910) associated with a particular collaborative document as one or more client computing device(s) 102*a-n* associated with one or more respective user profiles are simultaneously generating textual content for the particular collaborative document. The document merge manager 124 is also configured to generate collaborator metadata 504 from the one or more user input step event(s) 408 and/or the collaborative document. The collaborator metadata 504 can comprise metadata including, but not limited to, one or more user profile identifier(s) 910, a document position associated with one or more dynamic text insertion cursors associated with a respective user profile identifier 910, and/or other metadata associated with the one or more user profile identifier(s) 910.

The document merge manager 124 is also configured to generate a document object 502 representative of the particular collaborative document based on the contents of the event processing queue and the collaborator metadata 504 associated with the particular collaborative document. The document merge manager 124 continues to incrementally build the document object 502 as more user input step event(s) 408 are added to the event processing queue. In this way, the document merge manager 124 has a real-time state of the particular collaborative document and the current positions of the one or more dynamic text insertion cursors related to the one or more respective user profiles associated with the one or more client computing device(s) 102*a-n* that are simultaneously generating textual content for the particular collaborative document. Additionally, the document object can comprise one or more user profile passages associated with one or more user profiles related to the collaborative document. The document merge manager 124 is configured to send the document object to the document object analyzer 126.

The document object analyzer 126 is configured to determine whether the entire document object 502 should be used as model input for the document merge model(s) 128 or whether one or more portions of the document object 502 (e.g., one or more portions of textual content associated with sequenced textual content 410 and/or one or more user profile passages comprised in the collaborative document) should be used as model input for the document merge model(s) 128. For example, if the size of the document object 502 surpasses a predefined document size threshold, the document object analyzer 126 can determine to parse a predefined portion of textual content comprised in the document object 502 associated with sequenced textual content 410 relative to the position of a dynamic text insertion cursor on the interactive user interface associated with the collaborative document, where the dynamic text insertion cursor indicates a relative typing position associated with a particular user profile.

For example, if a client computing device 102*a* associated with the user profile Alice is generating text in a collaborative document, the document object analyzer 126 can parse a portion of textual content comprised in the document object 502 that associated with sequenced textual content 410 representing an entire sentence stem immediately preceding the dynamic text insertion cursor on the interactive user interface and transmit said portion of textual content to the document merge model(s) 128 to be used as model input. In various embodiments, the predefined portion of textual content associated with sequenced textual content 410 relative to a particular dynamic text insertion cursor which the document object analyzer 126 parses to use as model input can be configured to be a predefined number of words, sentences, paragraphs, pages, and/or the like relative to the position of the dynamic text insertion cursor.

The document object analyzer 126 is configured to transmit the predetermined portions of the document object 502 and the collaborator metadata 504 to the document merge model(s) 128 as model input. The document merge model(s) 128 can be machine learning models configured based on an artificial neural network (ANN) (e.g., such as a transformer model), a recurrent neural network (RNN) (e.g., such as a sequence-to-sequence model), a convolutional neural network (CNN), a natural language processing (NLP) model, and/or any other relevant deep learning model configured to employ artificial intelligence and/or machine reasoning to generate document merge resolution(s) 506 based on the predetermined portions of the document object 502 and the collaborator metadata 504. The document merge model(s) 128 can determine one or more document conflicts associated with a particular collaborative document based on the document object 502. Document conflicts can comprise, but are not limited to, a duplicate textual content conflict, a duplicate subject matter conflict, a document item sequencing conflict, and/or a document markup conflict.

The document merge model(s) 128 can generate document merge resolution(s) 506 based on the predetermined portions of the document object 502, the collaborator metadata 504, and the one or more determined document conflicts. The one or more document merge resolution(s) 506 can comprise, but are not limited to, one or more textual content deletion resolutions, one or more textual content merging resolutions, one or more document item resequencing resolutions, and/or one or more textual content markup resolutions. In various circumstances, the document merge resolution(s) 506 generated by the document merge model(s) 128 can comprise one or more document merge resolutions that are combinations of one or more textual content deletion resolutions, one or more textual content merging resolutions, one or more document item resequencing resolutions, and/or one or more textual content markup resolutions.

The document merge model(s) 128 can transmit the document merge resolution(s) 506 to the document merge manager 124, and the document merge manager 124 can transmit the document merge resolution(s) 506 to the document collaboration computing device 106 of the document collaboration platform 104. The document merge resolution component 112 of the document collaboration computing device 106 can generate one or more suggested document merge resolution recommendations 508 to address the one or more document conflicts in the collaborative document based on document merge resolution(s) 506 that are associated with a merge resolution confidence score below a predefined document merge resolution threshold. In some embodiments, the document merge resolution component 112 can render the suggested document merge resolution recommendations 508 on the client computing devices 102*a* and 102*b* via respective interactive user interfaces associated with the collaborative document. In various other embodiments, the document merge resolution component 112 can render the suggested document merge resolution recommendations 508 on a client computing device (e.g., client computing device 102*a*) associated with a dominant user.

In various embodiments, the document merge resolution system 122 can be configured to merge and/or combine online and offline versions of the same collaborative document. The document merge resolution system 122 can merge the online and offline versions of the same collaborative document by detecting one or more document conflicts between the online and offline versions of the same collaborative document and generating one or more corresponding document merge resolution(s) 506. For example, in the event that one or more client computing devices 102*a-n* of the two or more client computing devices 102*a-n* generating textual content for a collaborative document loses connectivity to the document collaboration platform 104 during a collaborative editing session, a “local” offline version of the collaborative document can be stored on the one or more client computing devices 102*a-n* that lost connectivity.

In such a scenario, the one or more client computing devices 102*a-n* can continue to generate and/or update textual content associated with the offline version of the collaborative document. When the one or more client computing devices 102*a-n* regains connectivity to the document collaboration platform 104, the document merge resolution system 122 can automatically merge the offline version of the collaborative document with the current online version of the collaborative document by resolving any document conflicts between the offline and online versions of the collaborative document. The updated online version of the collaborative document can be stored in a document collaboration data repository 116 associated with the document collaboration platform 104.

In such scenarios, the document merge manager 124 can generate a document object 502 based on the online and offline versions of the collaborative document, and the document object analyzer 126 can be configured to transmit the document object 502 comprising the online and offline versions of the collaborative document to the document merge model(s) 128.

The document merge model(s) 128 can detect one or more document conflicts between the online and offline versions of the collaborative document and generate one or more document merge resolution(s) 506. The document merge resolution component 112 of the document collaboration computing device 106 can generate one or more suggested document merge resolution recommendations 508 based on document merge resolution(s) 506. The document collaboration computing device 106 can generate an updated online version of the collaborative document by employing the one or more corresponding suggested document merge resolution recommendations 508 and the updated online version of the collaborative document can be stored in a document collaboration data repository 116 associated with the document collaboration platform 104.

Example Processes of the Disclosure

Figure 6:
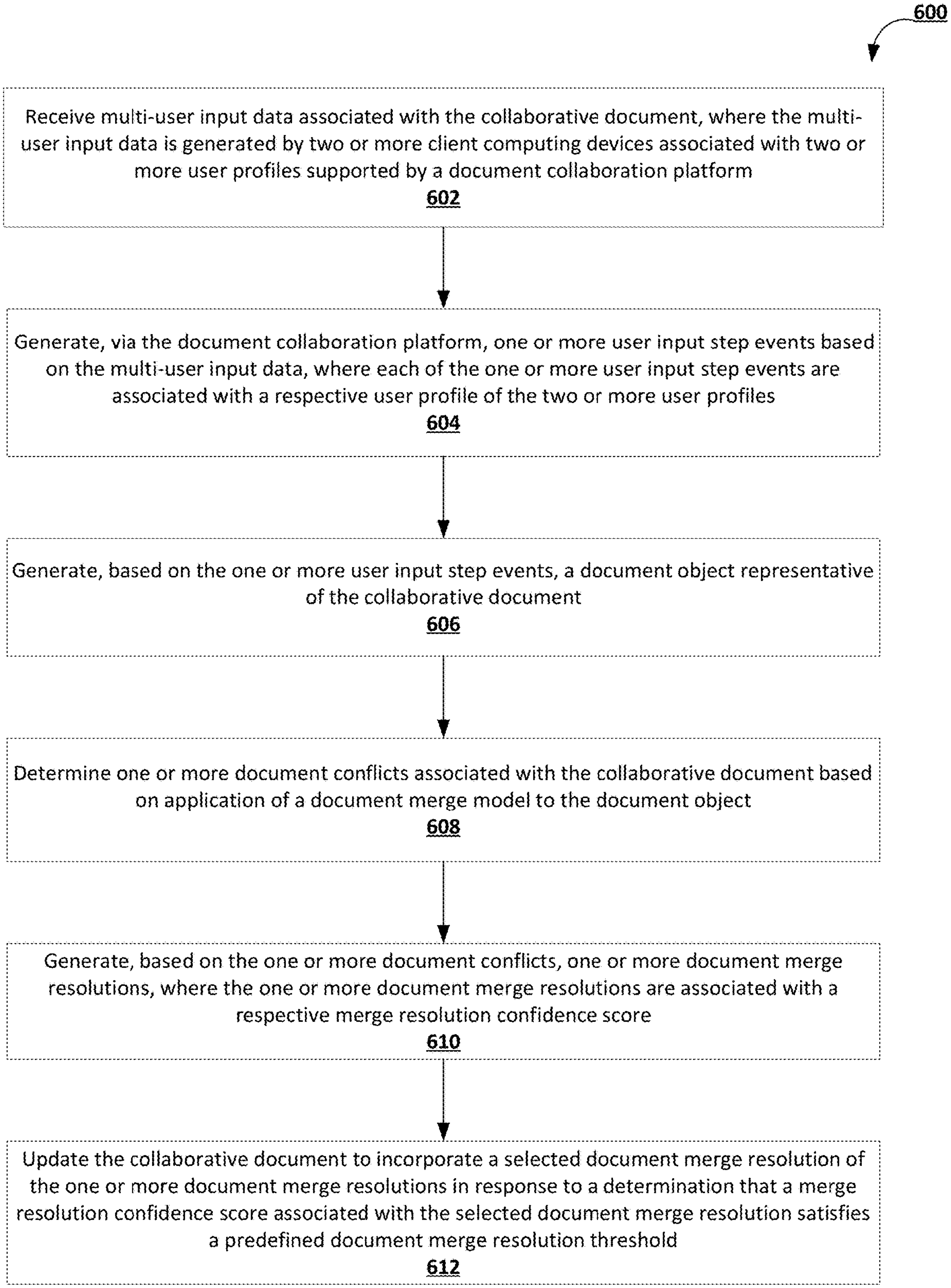
FIG. 6 illustrates a flowchart representing a process 600 for automatically generating document merge resolutions for a collaborative document in accordance with one or more embodiments of the present disclosure.

FIG. 6 illustrates a flowchart representing a process for automatically resolving document conflicts for a collaborative document in accordance with one or more embodiments of the present disclosure. Specifically, FIG. 6 details a process 600 for generating document merge resolution(s) 506 for addressing one or more document conflicts in a collaborative document for two or more user profiles associated with two or more respective client computing device(s) 102*a-n* simultaneously generating textual content for the collaborative document. In some embodiments, the process 600 is embodied by computer program code stored on a non-transitory computer-readable storage medium of a computer program product configured for execution to perform the process as depicted and described.

Additionally or alternatively, in some embodiments, the process 600 is performed by one or more specially configured computing devices, such as the document collaboration computing device 106 alone or in communication with one or more other component(s), device(s), and/or system(s) (e.g., document merge resolution system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., document collaboration computing device 106 embodied by document collaboration platform 104 and integrated with the document merge resolution system 122). For purposes of simplifying the description, the process 600 is described as performed by and from the perspective of the document collaboration computing device 106.

The process 600 begins at operation 602. At operation 602, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that receives multi-user input data associated with the collaborative document, wherein the multi-user input data is generated by two or more client computing devices associated with two or more user profiles supported by a document collaboration platform.

For example, the input step event component 108 associated with the document collaboration platform 104 is configured to receive one or more portions of multi-user input data (e.g., multi-user input data 406) from one or more client computing device(s) 102*a-n*. The multi-user input data (e.g., multi-user input data 406) can comprise data associated with one or more input commands generated by one or more peripheral input devices capable of manipulating the client computing device 102*a* (e.g., via input/output circuitry 306). For example, the one or more input commands can be commands issued by a computer mouse, computer keyboard, electronic touchpad, interactive touch display, electronic stylus, and/or the like. It will be appreciated that when one or more client computing device(s) 102*a-n* are simultaneously generating textual content for the collaborative document during a collaborative editing session, the one or more client computing device(s) 102*a-n* can simultaneously generate multi-user input data (e.g., multi-user input data 406) to be processed and broadcast as one or more user input step events (e.g., user input step event(s) 408).

At operation 604, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generate, via the document collaboration platform, one or more user input step events based on the multi-user input data, wherein each of the one or more user input step events are associated with a respective user profile of the two or more user profiles. For example, the input step event component 108 is configured to generate, based on the multi-user input data (e.g., multi-user input data 406), one or more user input step events (e.g., user input step event(s) 408).

In various embodiments, the one or more user input step events (e.g., user input step event(s) 408) can contain various portions of metadata related to, but not limited by, an input step event type 902, an input step event sequence range 904, a textual content type identifier 906, one or more portions of textual content data 908, a user profile identifier 910, and/or timestamp data 912 associated with the user input step event(s) 408. It will be appreciated that when two client computing devices (e.g., client computing devices 102*a* and 102*b*) are simultaneously generating textual content for a collaborative document, the two client computing devices may generate multi-user input data (e.g., multi-user input data 406), at the same time. In such cases, the input step event component 108 may generate user input step events (e.g., user input step event(s) 408) comprising short input step event sequence range(s) 904, and therefore short, disjointed textual content. However, because of the input step event sequence range 904 metadata and the corresponding timestamp data 912, the document sequence component 110 is able to stitch the user input step events (e.g., user input step event(s) 408) together to generate structured and organized sequenced textual content (e.g., sequenced textual content 410).

At operation 606, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generates, based on the one or more user input step events, a document object representative of the collaborative document.

The document merge manager 124 is also configured to generate a document object 502 representative of the particular collaborative document based on the contents of the event processing queue and the collaborator metadata 504 associated with the particular collaborative document. The document merge manager 124 continues to incrementally build the document object 502 as more user input step event(s) 408 are added to the event processing queue. In this way, the document merge manager 124 has a real-time state of the particular collaborative document and the current positions of the one or more dynamic text insertion cursors related to the one or more respective user profiles associated with the one or more client computing device(s) 102*a-n* that are simultaneously generating textual content for the particular collaborative document. Additionally, the document object can comprise one or more user profile passages associated with one or more user profiles related to the collaborative document.

At operation 608, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that determines one or more document conflicts associated with the collaborative document based on application of a document merge model to the document object.

For example, a document merge model 128 can generate document merge resolution(s) 506 based on the predetermined portions of a document object 502 representative of the collaborative document and collaborator metadata 504 associated with the collaborative document. The document merge model 128 can determine one or more document conflicts associated with a particular collaborative document based on the document object 502. Document conflicts can comprise, but are not limited to, a duplicate textual content conflict, a duplicate subject matter conflict, a document item sequencing conflict, and/or a document markup conflict.

A duplicate textual content conflict can be a situation in which two or more client computing devices (e.g., client computing device(s) 102*a-n*) associated with two or more respective user profiles have generated two or more portions of textual content that are the same or similar. In various embodiments, a document merge model 128 can apply various neural language processing algorithms in order to detect when two or more portions of textual content are similar, but not quite the same.

A duplicate subject matter conflict can be a situation in which two or more client computing devices (e.g., client computing device(s) 102*a-n*) associated with two or more respective user profiles have generated one or more portions of textual content that are directed towards the same subject matter. While the two or more portions of textual content may not use the exact same language, the document merge model 128 can detect that the two or more portions of textual content are directed towards the same subject matter and generate document merge resolution(s) 506 that comprise merging, editing, and or updating the two or more portions of textual content.

A document item sequencing conflict can be a situation in which two or more client computing devices (e.g., client computing device(s) 102*a-n*) associated with two or more respective user profiles are generating numbered or alphabetized lists in a collaborative document and a client computing device of the two or more client computing devices generates a list item with a duplicate number or letter. The document merge model 128 can detect the sequencing or alphabetizing conflict and generate a document merge resolution 506 to correctly sequence the numbered or alphabetized list. In some embodiments, the document merge model can automatically update the collaborative document such that the numbered or alphabetized list is correctly sequenced without intervention by the two or more client computing devices.

Additionally or alternatively, a document item sequencing conflict can be a situation in which two or more list items comprised in a numbered or alphabetized list in a collaborative document comprise two or more portions of textual content that are the same or similar, and/or are directed towards the same subject matter. The document merge model 128 can determine that one or more list items need to be deleted, updated, merged, and/or combined.

At operation 610, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generates, based on the one or more document conflicts, one or more document merge resolutions, where the one or more document merge resolutions are associated with a respective merge resolution confidence score.

For example, the document merge model 128 can generate one or more document merge resolution(s) 506 to address one or more document conflicts associated with the collaborative document. The document merge resolution(s) 506 can comprise, but are not limited to, one or more textual content deletion resolutions, one or more textual content merging resolutions, one or more document item resequencing resolutions, and/or one or more textual content markup resolutions. In various circumstances, the document merge model 128 can generate one or more document merge resolution(s) 506 that are combinations of one or more textual content deletion resolutions, one or more textual content merging resolutions, one or more document item resequencing resolutions, and/or one or more textual content markup resolutions.

A textual content deletion resolution can be a resolution to delete one or more portions of textual content generated for a collaborative document by one or more client computing devices associated with one or more respective user profiles. A document item resequencing resolution can be a resolution to eliminate and/or re-sequence a numbered or alphabetized one or more list items with erroneous numbering or alphabetization. In some embodiments, the document merge model 128 can automatically update and/or re-sequence a numbered or alphabetized list comprising sequencing errors without intervention (e.g., a confirmation signal) by the two or more client computing devices 102*a-n* generating the numbered or alphabetized list. Additionally or alternatively, a document item resequencing resolution can be a resolution to delete, update, merge, and/or combine two or more list items that comprise two or more portions of textual content that are the same or similar, and/or are directed towards the same subject matter.

A textual content merging resolution can be a resolution to merge and/or combine two or more portions of textual content in a collaborative document. For example, if the document merge model 128 detects a duplicate subject matter conflict in which two or more user profile passages in a collaborative document are directed to the same or similar subject matter, the document merge model 128 can merge and/or combine the two or more user profile passages. In circumstances where two or more user profile passages in a collaborative document are merged and/or combined, a third user profile passage can be generated and the two or more user profile passages that were merged and/or combined can be deleted such that collaborative document remains structured, organized, and logical.

A textual content markup resolution can be a resolution to remove or merge two or more types of text markup formatting for a particular portion of sequenced textual content 410. For example, if the document merge model 128 detects a document markup conflict in which a particular portion of sequenced textual content 410 has been formatted in various way by two or more client computing devices 102*a-n*, the document merge model 128 can determine whether to remove one or more of the various text markup formats or combine the text markup formats. In circumstances in which the text markup can't be combined (e.g., if two client computing devices 102*a-n* have both attempted to change the color of the sequenced textual content) the document merge model 128 can determine which text markup change will be prioritized. When appropriate, the document merge model can determine that the two or more types of text markup formatting should be merged. For example, if a first client computing device 102*a* attempts to italicize a portion of sequenced textual content 410 while a second client computing device 102*b* attempts to bolden the same portion of sequenced textual content 410.

The document merge model 128 can calculate a merge resolution confidence score for each of the one or more document merge resolution(s) 506. In various embodiments, the merge resolution confidence score can be derived based on previously generated document merge resolution(s) 506 that were associated with positive confirmation signals.

At operation 612, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that updates the collaborative document to incorporate a selected document merge resolution of the one or more document merge resolutions in response to a determination that a merge resolution confidence score associated with the selected document merge resolution satisfies a predefined document merge resolution threshold.

For example, in scenarios where the merge resolution confidence score associated with a particular document merge resolution 506 satisfies a predefined document merge resolution threshold, the document merge resolution 506 generated by the document merge model can be automatically incorporated into the collaborative document. If a client computing device does not revert the automatically incorporated document merge resolution 506, the document collaboration computing device can transmit a positive confirmation signal to the document merge resolution system. As such, the positive confirmation signal associated with the automatically incorporated document merge resolution 506 can be employed to refine the document merge models to better calculate future merge resolution confidence scores for future document merge resolutions 506 associated with one or more future document conflicts.

Figure 7:
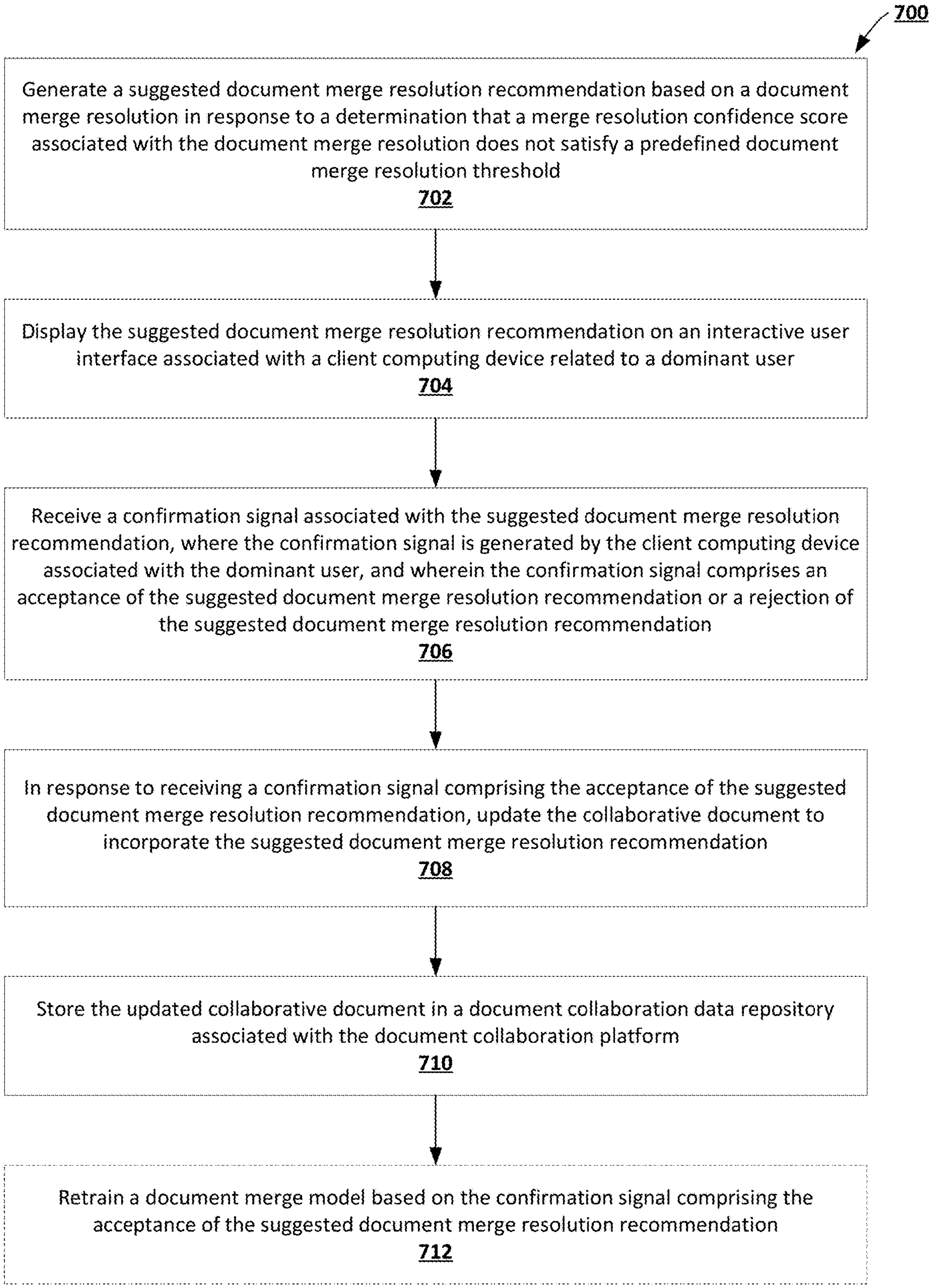
FIG. 7 illustrates a flowchart representing a process 700 for generating suggested document merge resolution recommendations in order to resolve document conflicts for a collaborative document in accordance with one or more embodiments of the present disclosure.

FIG. 7 illustrates a flowchart representing a process 700 for resolving one or more document conflicts for a collaborative document in accordance with one or more embodiments of the present disclosure. Specifically, FIG. 7 details a process 700 for generating suggested document merge resolution recommendations in order to resolve one or more document conflicts for a collaborative document for two or more user profiles associated with two or more respective client computing device(s) 102*a-n* simultaneously generating textual content for the collaborative document. In some embodiments, the process 700 is embodied by computer program code stored on a non-transitory computer-readable storage medium of a computer program product configured for execution to perform the process as depicted and described.

Additionally or alternatively, in some embodiments, the process 700 is performed by one or more specially configured computing devices, such as the document collaboration computing device 106 alone or in communication with one or more other component(s), device(s), and/or system(s) (e.g., document merge resolution system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., document collaboration computing device 106 embodied by document collaboration platform 104 and integrated with the document merge resolution system 122). For purposes of simplifying the description, the process 700 is described as performed by and from the perspective of the document collaboration computing device 106.

The process 700 begins at operation 702. At operation 702, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generates a suggested document merge resolution recommendation based on a document merge resolution in response to a determination that a merge resolution confidence score associated with the document merge resolution does not satisfy a predefined document merge resolution threshold.

For example, in one or more embodiments, if a particular document merge resolution 506 is associated with a merge resolution confidence score below the predefined document merge resolution threshold, a suggested document merge resolution recommendation 508 associated with the particular document merge resolution 506 generated by the document merge model(s) 128 can be presented to an end user related to a user profile associated with a client computing device 102*a-n* prompting the end user to affirmatively or negatively confirm the incorporation of the suggested document merge resolution recommendation 508 into the collaborative document. The document merge resolution component 112 is configured to generate one or more suggested document merge resolution recommendation(s) 508 associated with document merge resolutions that have been assigned a merge resolution confidence score below the predefined document merge resolution threshold.

At operation 704, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that displays the suggested document merge resolution recommendation on an interactive user interface associated with a client computing device related to a dominant user.

For example, the document merge resolution component 112 can render the suggested document merge resolution recommendation 508 on one or more interactive user interfaces associated with the collaborative document. In some embodiments, the suggested document merge resolution recommendation 508 is only rendered on an interactive user interface associated with a client computing device (e.g., client computing device 102*a*) related to a user profile designated as a dominant user. The dominant user is associated with a user profile responsible for generating a majority of the textual content related to the one or more document conflicts related to the suggested document merge resolution recommendation 508.

In other embodiments the suggested document merge resolution recommendation 508 is rendered on the two or more client computing devices 102*a-n* generating textual content for the collaborative document, however the one or more client computing devices 102*a-n* that aren't designated at the dominant user are only able to see "read-only" versions of the textual content associated with the suggested document merge resolution recommendation 508.

For example, the document collaboration computing device 106 can transmit the suggested document merge resolution recommendation 508 generated by the document merge resolution component 112 to two or more client computing devices 102*a-n* associated with two or more respective user profiles (e.g. user profiles Alice and Bob). The document collaboration computing device 106, by way of the document merge resolution component 112, can display the one or more suggested document merge resolution recommendation 508 via one or more interactive user interfaces associated with the collaborative document in various ways.

For example, the document collaboration computing device 106 can display the suggested document merge resolution recommendation 508 in various way including, but not limited to, displaying the textual content associated with the suggested document merge resolution recommendation 508 in various alternate colors relative to the color of the sequenced textual content rendered on the interactive user interface (e.g., rendering the text associated with the suggested document merge resolution recommendation 508 in blue if the current text is black), applying various emphases to textual content based on the suggested document merge resolution recommendation 508 (e.g., struck-through text, highlighted text, italicized text, underlined text, bold text, and/or the like), applying various opacities to textual content based on the suggested document merge resolution recommendation 508 (e.g., semi-transparent text to differentiate the suggested document merge resolution recommendation 508 from the sequenced textual content), and/or applying various animations to textual content (e.g., blinking text associated with the suggested document merge resolution recommendation 508).

Once the suggested document merge resolution recommendations 508 are approved by the client computing device associated with the dominant user (e.g., client computing device 102*a*) via a transmitted confirmation signal, the alternate text formatting based on the suggested document merge resolution recommendation 508 is removed, and the suggested document merge resolution recommendation 508 are incorporated into the collaborative document and rendered on one or more interactive user interfaces as sequenced textual content (e.g., sequenced textual content 410).

At operation 706, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that receives a confirmation signal associated with the suggested document merge resolution recommendation 508, where the confirmation signal is generated by the client computing device (e.g., client computing device 102*a*) associated with the dominant user, and wherein the confirmation signal comprises an acceptance of the suggested document merge resolution recommendation 508 or a rejection of the suggested document merge resolution recommendation 508. For example, a client computing device associated with the dominant user (e.g., client computing device 102*a*) can approve or deny the insertion of the suggested document merge resolution recommendation 508 into the collaborative document. For instance, the client computing device 102*a* associated with a user profile for which suggested document merge resolution recommendation 508 have been generated can generate multi-user input data (e.g., a predefined keystroke combination such as "Ctrl+TAB") to confirm that the suggested document merge resolution recommendation 508 should be incorporated into the collaborative document.

At operation 708, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that, in response to receiving a confirmation signal comprising the acceptance of the suggested document merge resolution recommendation 508, update the collaborative document to incorporate the suggested document merge resolution recommendation 508. For example, once the suggested document merge resolution recommendation 508 is approved by the client computing device (e.g., client computing device 102*a*) via a transmitted confirmation signal, the document merge resolution component 112 finalizes and incorporates the suggested document merge resolution recommendation 508 into the collaborative document. Once incorporated into the collaborative document, the suggested document merge resolution recommendation 508 can be rendered as sequenced textual content (e.g., sequenced textual content 410).

At operation 710, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that stores the updated collaborative document in a document collaboration data repository associated with the document collaboration platform. For example, in circumstances in which the suggested document merge resolution recommendation 508 is approved, the document merge resolution component 112 is configured to store the updated collaborative document in the document collaboration data repository 116 (e.g., in the collaborative document data 120). At optional operation 712, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that retrains a document merge model based on the confirmation signal comprising the acceptance of the suggested document merge resolution recommendation 508. For example, the document merge model training component 114 can retrain, refine, and/or update one or more document merge model(s) 128 based on the positive or negative confirmation signals associated with one or more suggested document merge resolution recommendations 508 and/or one or more document merge resolution(s) 506. The confirmation signals, whether positive or negative, can be used to retrain and/or refine the document merge model(s) 128 such that the document merge model(s) 128 are iteratively updated to increase the accuracy of the document merge resolution(s) 506 over time.

Figure 8:
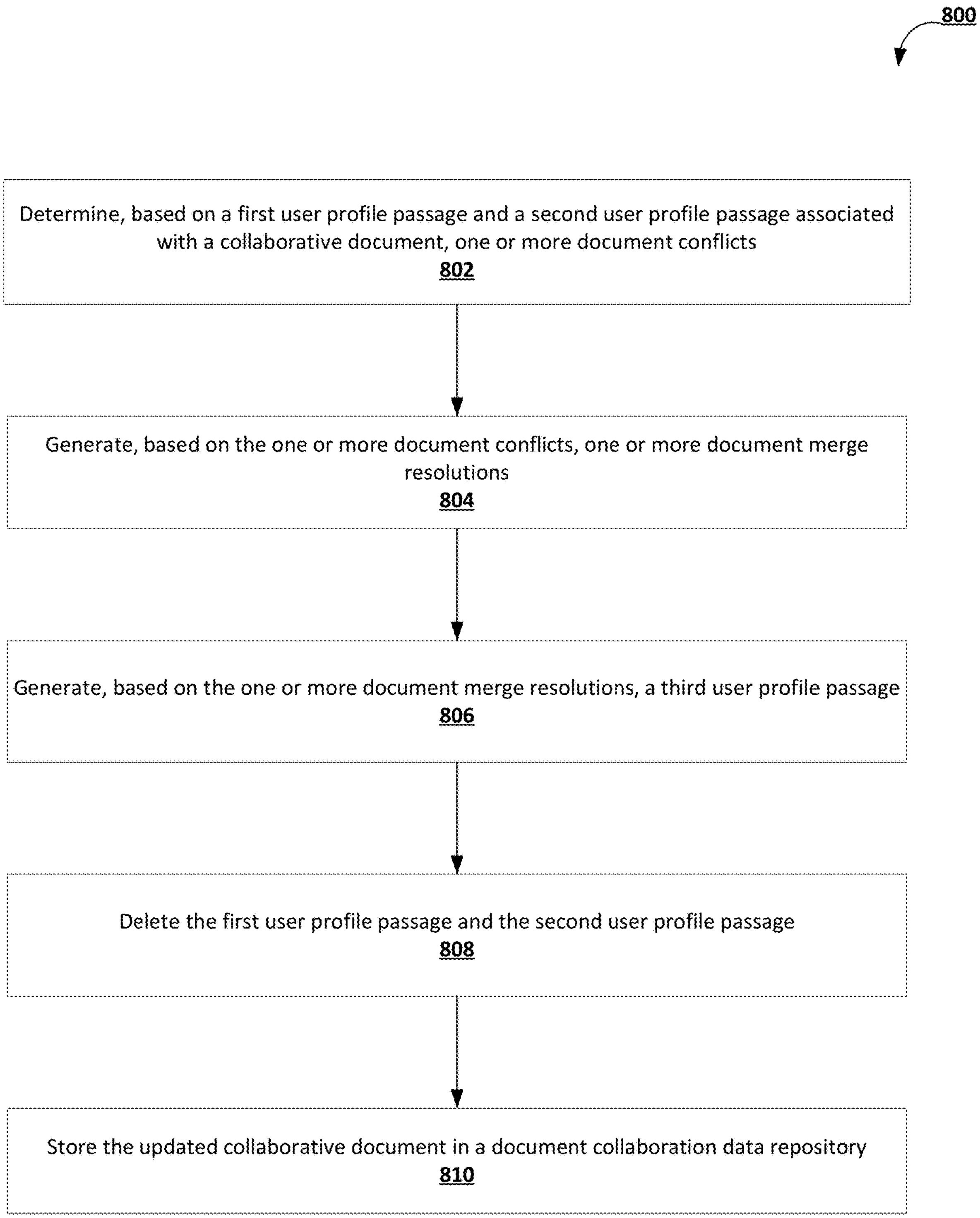
FIG. 8 illustrates a flowchart representing a process 800 for automatically merging two or more user profile passages in order to resolve one or more document conflicts for a collaborative document in accordance with one or more embodiments of the present disclosure.

FIG. 8 illustrates a flowchart representing a process 800 for automatically resolving one or more document conflicts for a collaborative document in accordance with one or more embodiments of the present disclosure. Specifically, FIG. 8 details a process 800 for automatically merging two or more portions of textual content in order to resolve one or more document conflicts for a collaborative document for two or more user profiles associated with two or more respective client computing device(s) 102*a-n* simultaneously generating textual content for the collaborative document. In some embodiments, the process 800 is embodied by computer program code stored on a non-transitory computer-readable storage medium of a computer program product configured for execution to perform the process as depicted and described.

Additionally or alternatively, in some embodiments, the process 800 is performed by one or more specially configured computing devices, such as the document collaboration computing device 106 alone or in communication with one or more other component(s), device(s), and/or system(s) (e.g., document merge resolution system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., document collaboration computing device 106 embodied by document collaboration platform 104 and integrated with the document merge resolution system 122). For purposes of simplifying the description, the process 800 is described as performed by and from the perspective of the document collaboration computing device 106.

The process 800 begins at operation 802. At operation 802, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that determines, based on a first user profile passage and a second user profile passage associated with a collaborative document, one or more document conflicts. The first and second user profile passages can be simultaneously generated by a first and second respective client computing device (e.g., client computing device(s) 102*a-n*) associated with a first and second respective user profile (e.g., user profiles corresponding to "Alice" and "Bob").

The document merge manager 124 of the document merge resolution system 122 can generate a document object 502 representative of the collaborative document based on the textual content associated with the collaborative document and the collaborator metadata 504 associated with the collaborative document. The document object can comprise the first user profile passage and the second user profile passage.

The document object analyzer 126 of the document merge resolution system 122 is configured to determine whether the entire document object 502 should be used as model input for the document merge model(s) 128 or whether one or more portions of the document object 502 (e.g., the first user profile passage and the second user profile passage) should be used as model input for the document merge model(s) 128. The document merge model(s) 128 can determine one or more document conflicts associated with first user profile passage and the second user profile passage comprised in the document object 502. Document conflicts can comprise, but are not limited to, a duplicate textual content conflict, a duplicate subject matter conflict, a document item sequencing conflict, and/or a document markup conflict. For example, the one or more document conflicts associated with the first user profile passage and the second user profile passage can be duplicate subject matter conflicts.

At operation 804, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generates, based on the one or more document conflicts, one or more document merge resolutions.

For example, based on the one or more document conflicts associated with first user profile passage and the second user profile passage, the document merge model(s) 128 can generate one or more document merge resolution(s) 506. The one or more document merge resolution(s) 506 can be, but are not limited to, one or more textual content deletion resolutions, one or more textual content merging resolutions, one or more document item resequencing resolutions, and/or one or more textual content markup resolutions.

For example, if the one or more document conflicts associated with the first user profile passage and the second user profile passage are duplicate subject matter conflicts, the document merge model(s) 128 can generate a textual content merging resolution in response. The textual content merging resolution can be a resolution to merge and/or combine the first user profile passage and the second user profile passage.

At operation 806, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that generates, based on the one or more document merge resolutions, a third user profile passage. The document merge model(s) 128 can transmit the document merge resolution(s) 506 to the document merge manager 124, and the document merge manager 124 can transmit the document merge resolution(s) 506 to the document collaboration computing device 106 of the document collaboration platform 104.

The document merge resolution(s) 506 can comprise textual content merging resolutions to be employed in order to merge and/or combine two or more portions of textual content in a collaborative document. For example, if the document merge model 128 detects a duplicate subject matter conflict in which two or more user profile passages in a collaborative document are directed to the same or similar subject matter, the document merge model 128 can merge and/or combine the two or more user profile passages. In circumstances where two or more user profile passages in a collaborative document are merged and/or combined, a third user profile passage can be generated and the two or more user profile passages that were merged and/or combined can be deleted such that collaborative document remains structured, organized, and logical. In such an instance, the document merge resolution(s) 506 related to the new, third user profile passage can reflect the enterprise merge resolution style reflecting a defined presentation style associated with a particular company, enterprise, and/or other organizational structure.

At operation 808, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that deletes the first user profile passage and the second user profile passage.

Once incorporated into the collaborative document, the document merge resolution(s) 506 can be rendered as sequenced textual content (e.g., the third user profile passage can be rendered as sequenced textual content 410). In circumstances where two or more user profile passages in a collaborative document are merged and/or combined (e.g., as a result of a duplicate subject matter conflict), a third user profile passage can be generated and the two or more user profile passages that were merged and/or combined can be deleted such that collaborative document remains structured, organized, and logical. For example, the first user profile passage and the second user profile passage associated with user profiles Alice and Bob respectively can be merged and/or combined as a result of an approval of the corresponding suggested document merge resolution recommendations 508. As such, a third user profile passage can be generated and the first user profile passage and the second user profile passage can be deleted such that collaborative document remains structured, organized, and logical.

At operation 810, the document collaboration computing device 106 includes means, such as the input step event component 108, the document sequence component 110, the document merge resolution component 112, the document merge model training component 114, communications circuitry 208, input/output circuitry 206, memory 204, and/or processor 202, or any combination thereof, that stores the updated collaborative document in a document collaboration data repository. For example, in circumstances in which the document merge resolution(s) 506 are incorporated into the collaborative document, the document merge resolution component 112 is configured to store the updated collaborative document in the document collaboration data repository 116 (e.g., in the collaborative document data 120).

It will be appreciated that while the exemplary embodiment described in process 700 above pertains to automatic document merge resolution for a single collaborative document being accessed by two client computing devices 102*a-n*, the automatic document merge resolution techniques described herein can be employed to merge and/or combine online and offline versions of the collaborative documents stored in the document collaboration data repository 116.

In various embodiments, the document merge resolution system 122 can be configured to merge and/or combine online and offline versions of the same collaborative document. The document merge resolution system 122 can merge the online and offline versions of the same collaborative document by detecting one or more document conflicts between the online and offline versions of the same collaborative document and generating one or more corresponding document merge resolution(s) 506. For example, in the event that one or more client computing devices 102*a-n* of the two or more client computing devices 102*a-n* generating textual content for a collaborative document loses connectivity to the document collaboration platform 104 during a collaborative editing session, a "local" offline version of the collaborative document can be stored on the one or more client computing devices 102*a-n* that lost connectivity.

In such a scenario, the one or more client computing devices 102*a-n* can continue to generate and/or update textual content associated with the offline version of the collaborative document. When the one or more client computing devices 102*a-n* regains connectivity to the document collaboration platform 104, the document merge resolution system 122 can automatically merge the offline version of the collaborative document with the current online version of the collaborative document by resolving any document conflicts between the offline and online versions of the collaborative document. The updated online version of the collaborative document can be stored in a document collaboration data repository 116 associated with the document collaboration platform 104.

In such scenarios, the document merge manager 124 can generate a document object 502 based on the online and offline versions of the collaborative document, and the document object analyzer 126 can be configured to transmit the document object 502 comprising the online and offline versions of the collaborative document to the document merge model(s) 128.

The document merge model(s) 128 can detect one or more document conflicts between the online and offline versions of the collaborative document and generate document merge resolution(s) 506. The document merge resolution component 112 of the document collaboration computing device 106 can generate one or more suggested document merge resolution recommendations 508 based on the document merge resolution(s) 506. The document collaboration computing device 106 can generate an updated online version of the collaborative document by employing the one or more corresponding suggested document merge resolution recommendations 508 and the updated online version of the collaborative document can be stored in a document collaboration data repository 116 associated with the document collaboration platform 104.

FIGS. 9A-B, previously described herein, depict operational examples of user input step event(s) 408 in accordance with one or more embodiments of the present disclosure. In various embodiments, the one or more user input step event(s) 408 can contain various portions of metadata related to, but not limited by, an input step event type 902, an input step event sequence range 904, a textual content type identifier 906, one or more portions of textual content data 908, a user profile identifier 910, and/or timestamp data 912 associated with the user input step event(s) 408. FIG. 9A illustrates a user input step event 408 generated based on multi-user input data 406 from a client computing device (e.g., client computing device 102*a*) associated with a user profile with a user profile identifier 910 of "Alice." FIG. 9B illustrates a user input step event 408 generated based on multi-user input data 406 from a client computing device (e.g., client computing device 102*b*) associated with a user profile with a user profile identifier 910 of "Bob."

Figure 10:
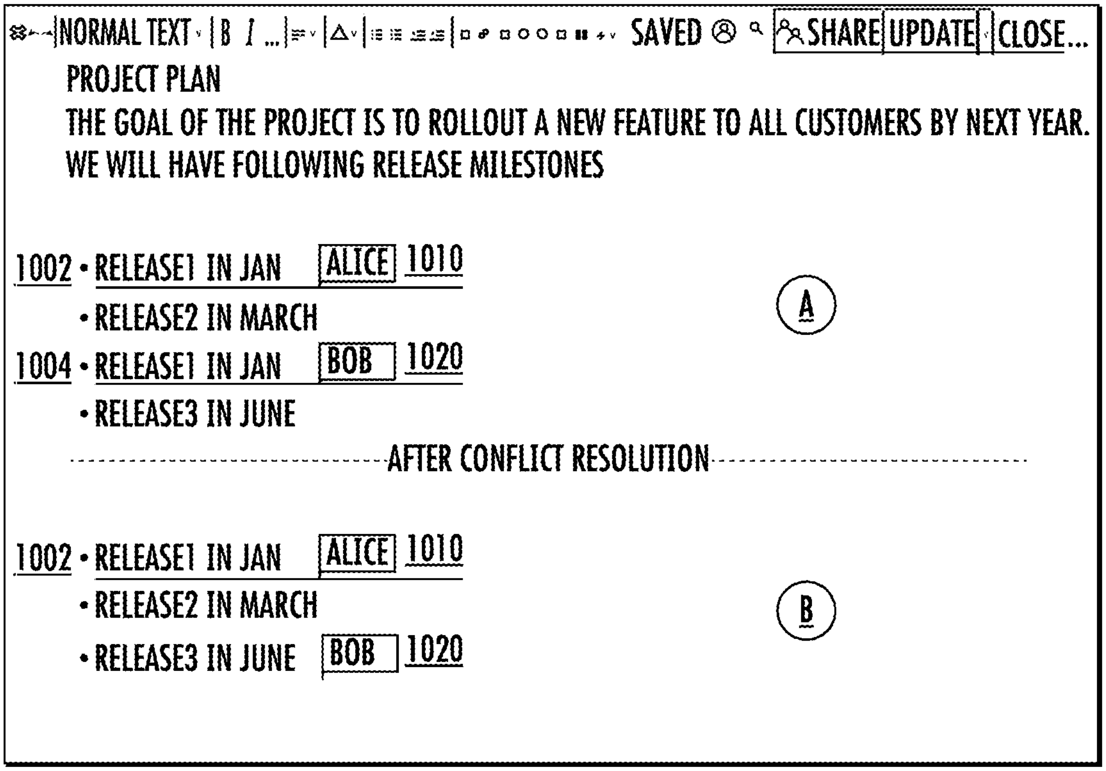
FIG. 10 provides an operational example of an automatic document merge resolution for addressing a duplicate textual content conflict in a collaborative document in accordance with one or more embodiments of the present disclosure.

FIG. 10 provides an operational example of an automatic document merge resolution for addressing a duplicate textual content conflict in a collaborative document in accordance with one or more embodiments of the present disclosure. Specifically, FIG. 10 provides two views A and B of an interactive user interface associated with a collaborative document before and after (respectively) one or more of the automatic document merge resolution techniques described herein has been employed.

FIG. 10 illustrates how two client computing device(s) 102*a-n* associated with two user profiles can simultaneously generate textual content for a collaborative document. For example, the dynamic text insertion cursor 1010 is associated with the user profile for an end user, Alice, and the dynamic text insertion cursor 1020 is associated with the user profile for an end user, Bob. As depicted in view A of FIG. 10, Alice has generated textual content for the collaborative document which is rendered on the interactive user interface as sequenced textual content 1002. Likewise, Bob has simultaneously generated textual content for the collaborative document which is rendered on the interactive user interface as sequenced textual content 1004.

The textual content associated with the sequenced textual content 1004 has introduced a duplicate textual content conflict into the collaborative document. As seen in view A of FIG. 10, a duplicate textual content conflict can be a situation in which two or more client computing devices 102*a-n* associated with two or more respective user profiles (e.g., Alice and Bob) have generated two or more portions of textual content that are the same or similar.

In such a scenario, a document merge model 128 can generate document merge resolution(s) 506 to address the duplicate textual content conflict, such as, for example, a textual content deletion resolution to delete the portion of textual content comprising the duplicated textual content. A textual content deletion resolution can be a resolution to delete one or more portions of textual content generated for a collaborative document by one or more client computing devices 102*a-n* associated with one or more respective user profiles (e.g., Alice and Bob).

Accordingly, view B of FIG. 10 depicts the automatic incorporation of a textual content deletion resolution generated by the document merge model 128 wherein the textual content generated by Bob that is associated with the sequenced textual content 1004 has been automatically deleted. The incorporation of the textual content deletion resolution was automatic because the textual content deletion resolution was determined by the document merge model 128 to have a merge resolution confidence score above a predefined document merge resolution threshold.

In this case, if the dominant user (as determined by the document merge model 128) does not revert the textual content deletion resolution to delete the textual content associated with the sequenced textual content 1004, the textual content deletion resolution will be persisted in the collaborative document. Additionally, if the textual content deletion resolution is not reverted, the document merge model training component 114 of the document collaboration computing device 106 can transmit a positive confirmation signal to the document merge model 128. The positive confirmation signal can be used to refine the document merge model 128 such that future document merge resolutions (e.g., document merge resolution(s) 506) will become more accurate over time.

Figure 11:
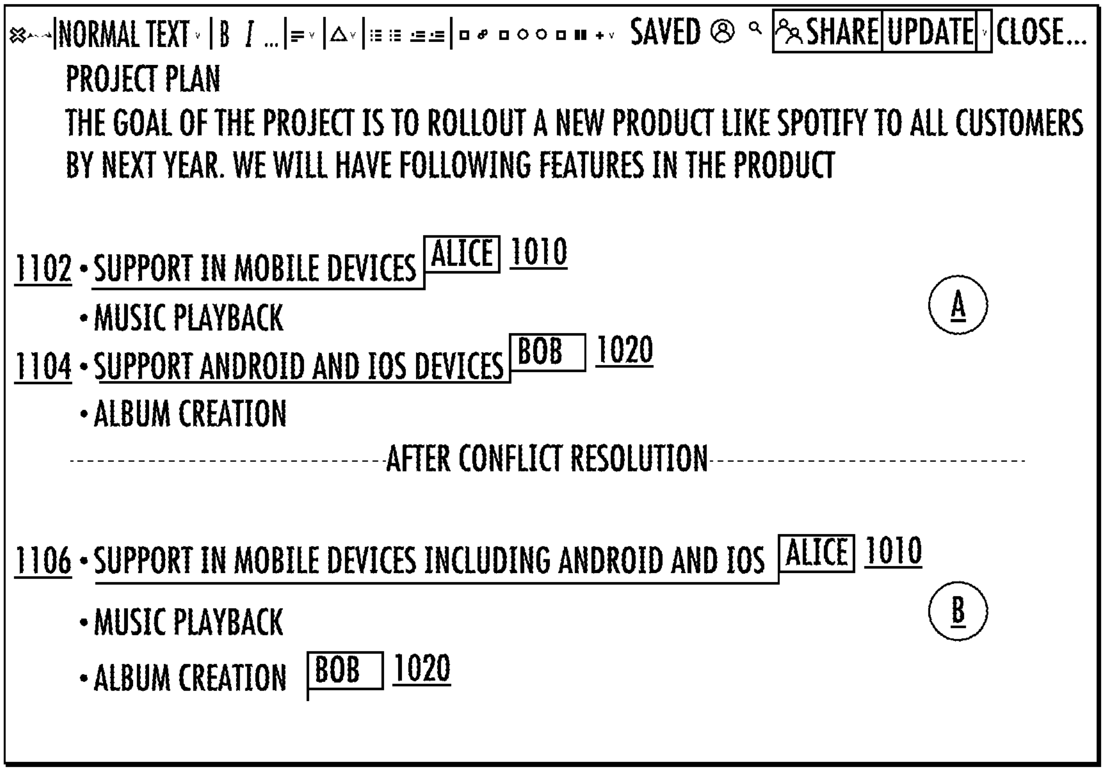
FIG. 11 provides an operational example of an automatic document merge resolution executed to reflect a group intent associated with a collaborative document in accordance with one or more embodiments of the present disclosure.

FIG. 11 provides an operational example of an automatic document merge resolution executed to reflect a group intent associated with a collaborative document in accordance with one or more embodiments of the present disclosure. Specifically, FIG. 11 provides two views A and B of an interactive user interface associated with a collaborative document before and after (respectively) one or more of the automatic document merge resolution techniques described herein has been employed.

FIG. 11 illustrates how embodiments of the present disclosure can employ one or more automatic document merge resolution techniques while simultaneously reflecting a group- and/or document-level intent. Views A and B of FIG. 11 illustrate how two client computing device(s) 102*a-n* associated with two user profiles (e.g. Alice and Bob) can simultaneously generate textual content associated with a bulleted list for a collaborative document. In view A, sequenced textual content 1102 and 1104 represent respective portions of textual content simultaneously generated by Alice and Bob respectively. The addition of the textual content associated with sequenced textual content 1104 has introduced a duplicate subject matter conflict into the collaborative document.

A duplicate subject matter conflict can be a situation in which two or more client computing device(s) 102*a-n* associated with two or more respective user profiles (e.g., Alice and Bob) have generated one or more portions of textual content that are directed towards the same subject matter. While the two or more portions of textual content may not use the exact same language, the document merge model 128 can detect that the two or more portions of textual content are directed towards the same subject matter, and generate document merge resolutions (e.g., document merge resolution(s) 506) that comprise merging, editing, and or updating the two or more portions of textual content.

For instance, the document merge model 128 has determined that the textual content associated with sequenced textual content 1102 and 1104 are both directed towards the same subject matter of mobile devices. As such, the document merge model 128 has generated one or more textual content merging resolutions. A textual content merging resolution can be a resolution to merge and/or combine two or more portions of textual content in a collaborative document. For example, if the document merge model 128 detects a duplicate subject matter conflict in which two or more user profile passages in a collaborative document are directed to the same or similar subject matter, the document merge model 128 can merge and/or combine the two or more user profile passages.

In circumstances where two or more user profile passages in a collaborative document are merged and/or combined, a third user profile passage can be generated and the two or more user profile passages that were merged and/or combined can be deleted such that collaborative document remains structured, organized, and logical. Such a circumstance is illustrated in view B of FIG. 11 wherein the textual content associated with the sequenced textual content 1102 and 1104 have both been automatically deleted and textual content associated with the sequenced textual content 1106 has been automatically generated. In such an instance, the document merge resolution (e.g., document merge resolution 506) comprising to the new, third user profile passage (represented by sequenced textual content 1106) can reflect an enterprise merge resolution style reflecting a defined presentation style associated with a particular company, enterprise, and/or other organizational structure (e.g., such as the particular enterprise that Alice and Bob are employed by).

Figure 12:
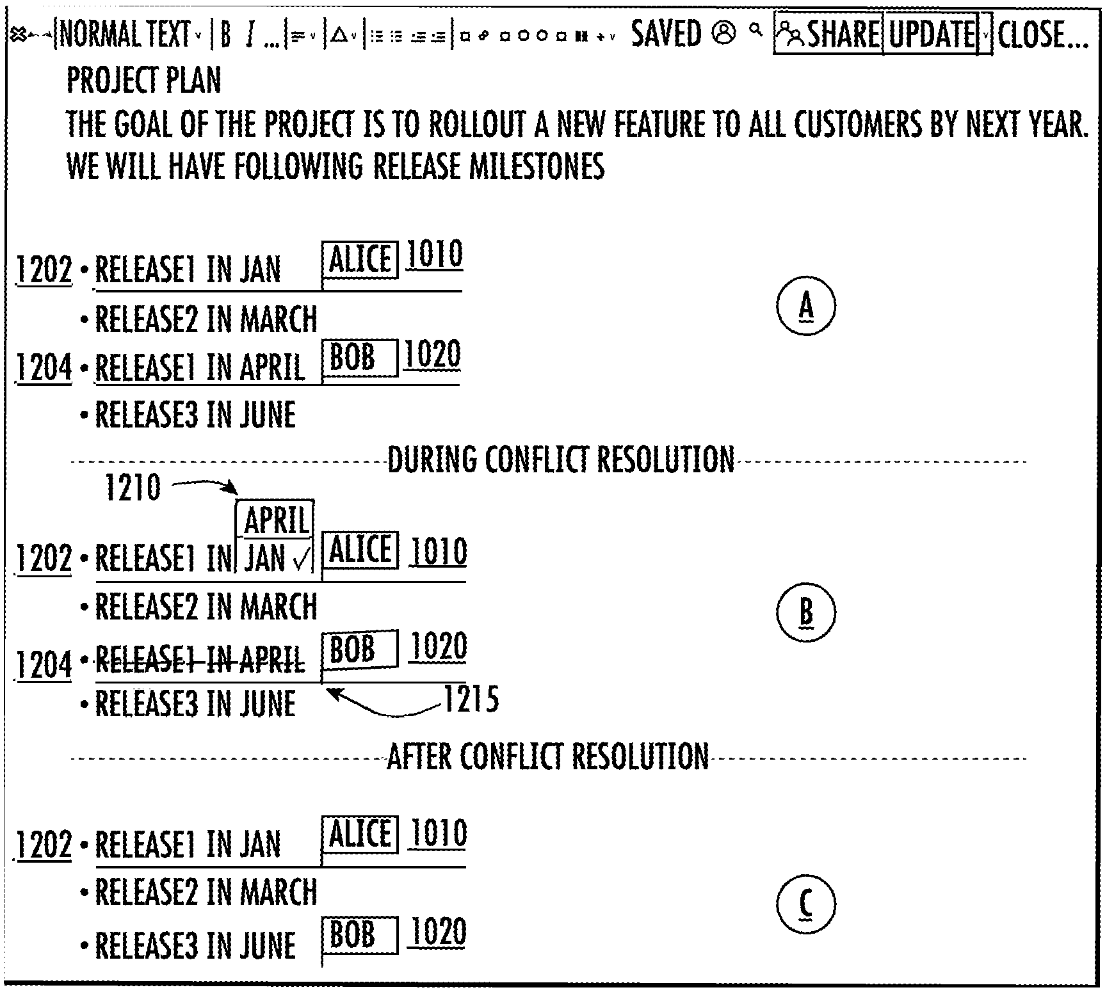
FIG. 12 provides an operational example of rendering a suggested document merge resolution recommendation for a collaborative document associated in accordance with one or more embodiments of the present disclosure.

FIG. 12 provides an operational example of rendering a suggested document merge resolution recommendation for a collaborative document associated in accordance with one or more embodiments of the present disclosure. Specifically, FIG. 12 provides three views A, B, and C of an interactive user interface associated with a collaborative document before, during, and after (respectively) one or more of the automatic document merge resolution techniques described herein has been employed.

Contrary to the example provided in FIG. 11, the example in FIG. 12 illustrates a scenario in which the document merge resolutions (e.g., document merge resolution(s) 506) generated by the document merge model 128 are determined to have a merge resolution confidence score below a predefined document merge resolution threshold. In such cases, the document merge resolution system 122 can direct the document collaboration computing device 106 to generate a suggested document merge resolution recommendation (e.g., suggested document merge resolution recommendation 508) based on one or more document merge resolutions generated by the document merge model 128. The document collaboration computing device 106 can render the suggested document merge resolution recommendation on one or more interactive user interfaces associated with the collaborative document (e.g., an interactive user interface associated with the dominant user).

For example, view A of FIG. 12 illustrates a scenario in which Bob has generated textual content associated with sequenced textual content 1204 that is similar to the textual content generated by Alice that is represented by sequenced textual content 1202. As such, Bob has introduced a document conflict into the collaborative document. However, in this instance, the document merge model 128 wasn't able to determine a document merge resolution (e.g., document merge resolution 506) with a merge resolution confidence score above the predefined document merge resolution threshold.

View B of FIG. 12 depicts user interface elements 1210 and 1215 that are associated with a suggested document merge resolution recommendation (e.g., suggested document merge resolution recommendation 508) based on one or more document merge resolutions (e.g., document merge resolution(s) 506) generated by the document merge model 128. In this example, the document merge model 128 wasn't able to determine whether the appropriate month related to "Release1" in the textual content associated with sequenced textual content 1202 and 1204 was supposed to be associated with January as written by Alice or with April as written by Bob.

In this example, the document merge model 128 has determined that Alice is the dominant user and, as such, the document collaboration computing device 106 has rendered the user interface element 1210 related to the suggested document merge resolution recommendation proximate to Alice's dynamic text insertion cursor 1010 so she can select the correct month. As Alice is the dominant user, Bob will not be able to confirm the correct month. However, in some embodiments, the document collaboration computing device 106 can render the sequenced textual content 1204 associated with the textual content related to the document conflicts in an altered formatting (e.g., struck-through text) via Bob's interactive user interface. Such alternate formatting can indicate to an end user that the textual content they have generated in involved in a document conflict associated with the collaborative document.

As depicted in view C, Alice selected January as the appropriate month from the user interface element 1210. As such, the document merge resolution system 122 has deleted the textual content associated with the sequenced textual content 1204 from the collaborative document. By choosing January from the user interface element 1210, Alice has transmitted a training signal to the document merge model 128. The dominant user can issue a positive confirmation signal or a negative confirmation signal respectively approving or rejecting the incorporation of the suggested document merge resolution recommendation (e.g., suggested document merge resolution recommendation 508) into the collaborative document. The confirmation signal, whether positive or negative, can be used to retrain and/or refine the document merge model 128 such that the document merge model 128 is iteratively updated to increase the accuracy of document merge resolutions (e.g., document merge resolution(s) 506) over time. In various embodiments, when a particular suggested document merge resolution recommendation is not selected, a negative confirmation signal is automatically associated with the respective document merge resolution associated with the particular suggested document merge resolution recommendation.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus.

Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data.

Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus for automatically resolving document conflicts in a collaborative document, the apparatus comprising a display, at least one processor, and at least one memory including program code, the at least one memory and the program code configured to, with the at least one processor, cause the apparatus to at least:

receive multi-user input data associated with the collaborative document, wherein the multi-user input data is generated by two or more client computing devices associated with two or more user profiles supported by a document collaboration platform, wherein the multi-user input data embodies textual content simultaneously generated by the two or more client computing devices during a collaborative editing session, and wherein a common representation of sequenced textual content associated with the collaborative document is rendered in near real time on respective interactive user interfaces associated with the two or more client computing devices;

generate, via the document collaboration platform, two or more user input step events based on the multi-user input data, wherein each of the two or more user input step events are associated with a respective user profile of the two or more user profiles;

generate, based on the two or more user input step events, a document object representative of the collaborative document;

determine one or more document conflicts arising as the two or more client computing devices are simultaneously generating textual content for the collaborative document during the collaborative editing session, the one or more document conflicts associated with the collaborative document based on application of a document merge model to the document object, wherein (i) the one or more document conflicts are associated with two or more portions of textual content that are similar within the collaborative document, and (ii) the two or more portions of textual content were provided by two or more different user profiles of the two or more user profiles;

determine, based on one or more pieces of metadata associated with the document object and user profile metadata, a dominant user profile of the two or more different user profiles;

generate, based on the one or more document conflicts, one or more document merge resolutions, wherein the one or more document merge resolutions are (i) associated with a respective merge resolution confidence score, and (ii) are based at least in part on a portion of the multi-user input data associated with the dominant user profile; and in response to a determination that a merge resolution confidence score associated with a selected document merge resolution of the one or more document merge resolutions satisfies a predefined document merge resolution threshold:

update the collaborative document to incorporate the selected document merge resolution.

2. The apparatus of claim 1, wherein the at least one memory and the program code are configured to, with the at least one processor, further cause the apparatus to:

in response to a determination that the merge resolution confidence score associated with the selected document merge resolution of the one or more document merge resolutions does not satisfy the predefined document merge resolution threshold:

generate a suggested document merge resolution recommendation based on the selected document merge resolution; and display the suggested document merge resolution recommendation on an interactive user interface associated with a client computing device related to a dominant user, wherein the dominant user is associated with a user profile of the two or more user profiles, and wherein the dominant user is determined by the document merge model based on metadata associated with the collaborative document.

3. The apparatus of claim 2, wherein the at least one memory and the program code are configured to, with the at least one processor, further cause the apparatus to:

receive a confirmation signal associated with the suggested document merge resolution recommendation, wherein the confirmation signal is generated by the client computing device associated with the dominant user, and wherein the confirmation signal comprises an acceptance of the suggested document merge resolution recommendation or a rejection of the suggested document merge resolution recommendation; and in response to receiving a confirmation signal comprising the acceptance of the suggested document merge resolution recommendation:

update the collaborative document to incorporate the suggested document merge resolution recommendation creating an updated collaborative document;

store the updated collaborative document in a document collaboration data repository associated with the document collaboration platform; and retrain the document merge model based on the confirmation signal comprising the acceptance of the suggested document merge resolution recommendation.

4. The apparatus of claim 1, wherein the at least one memory and the program code are configured to, with the at least one processor, further cause the apparatus to:

generate the one or more document merge resolutions associated with a second user profile passage associated with a second user profile, wherein the second user profile passage is a first portion of the two or more portions of textual content, wherein the one or more document merge resolutions associated with the second user profile passage is generated based on a first document conflict of the one or more document conflicts, and wherein the first document conflict is determined based on the second user profile passage and a first user profile passage associated with a first user profile identifier, and wherein the first user profile passage is a second portion of the two or more portions of textual content.

5. The apparatus of claim 1, wherein the at least one memory and the program code are configured to, with the at least one processor, further cause the apparatus to:

generate sequenced textual content based on the two or more user input step events, wherein the sequenced textual content can be associated with the two or more user profiles; and render, on one or more interactive user interfaces associated with the collaborative document, the sequenced textual content.

6. The apparatus of claim 1, wherein the one or more document conflicts comprise at least one of a duplicate textual content conflict, a duplicate subject matter conflict, a document item sequencing conflict, or a document markup conflict.

7. The apparatus of claim 1, wherein the one or more document merge resolutions comprise at least one of a textual content deletion resolution, a textual content merging resolution, a document item resequencing resolution, or a textual content markup resolution.

8. The apparatus of claim 1, wherein the document merge model can be trained based in part on one or more collaborative documents stored in a data repository of a particular document collaboration platform, and wherein the one or more collaborative documents comprise one or more user profile passages associated with one or more respective user profiles associated with the particular document collaboration platform.

9. The apparatus of claim 1, wherein the document merge model comprises a machine learning model configured based on an artificial neural network (ANN), a recurrent neural network (RNN), a convolutional neural network (CNN), or a natural language processing (NLP) model.

10. A computer-implemented method for automatically generating adaptive digital content for a collaborative document, the method comprising:

receiving multi-user input data associated with the collaborative document, wherein the multi-user input data is generated by two or more client computing devices associated with two or more user profiles supported by a document collaboration platform, wherein the multi-user input data embodies textual content simultaneously generated by the two or more client computing devices during a collaborative editing session, and wherein a common representation of sequenced textual content associated with the collaborative document is rendered in near real time on respective interactive user interfaces associated with the two or more client computing devices;

generating, via the document collaboration platform, two or more user input step events based on the multi-user input data, wherein each of the two or more user input step events are associated with a respective user profile of the two or more user profiles;

generating, based on the two or more user input step events, a document object representative of the collaborative document;

determining one or more document conflicts arising as the two or more client computing devices are simultaneously generating textual content for the collaborative document during the collaborative editing session, the one or more document conflicts associated with associated with the collaborative document based on application of a document merge model to the document object, wherein (i) the one or more document conflicts are associated with two or more portions of textual content that are similar within the collaborative document, and (ii) the two or more portions of textual content were provided by two or more different user profiles of the two or more user profiles;

determining, based on one or more pieces of metadata associated with the document object and user profile metadata, a dominant user profile of the two or more different user profiles;

generating, based on the one or more document conflicts, one or more document merge resolutions, wherein the one or more document merge resolutions (i) are associated with a respective merge resolution confidence score, and (ii) are based at least in part on a portion of the multi-user input data associated with the dominant user profile; and in response to a determination that a merge resolution confidence score associated with a selected document merge resolution of the one or more document merge resolutions satisfies a predefined document merge resolution threshold:

updating the collaborative document to incorporate the selected document merge resolution.

11. The computer-implemented method of claim 10, the method further comprising:

in response to a determination that the merge resolution confidence score associated with the selected document merge resolution of the one or more document merge resolutions does not satisfy the predefined document merge resolution threshold:

generating a suggested document merge resolution recommendation based on the selected document merge resolution; and displaying the suggested document merge resolution recommendation on an interactive user interface associated with a client computing device related to a dominant user, wherein the dominant user is associated with a user profile of the two or more user profiles, and wherein the dominant user is determined by the document merge model based on metadata associated with the collaborative document.

12. The computer-implemented method of claim 11, the method further comprising:

receiving a confirmation signal associated with the suggested document merge resolution recommendation, wherein the confirmation signal is generated by the client computing device associated with the dominant user, and wherein the confirmation signal comprises an acceptance of the suggested document merge resolution recommendation or a rejection of the suggested document merge resolution recommendation; and in response to receiving a confirmation signal comprising the acceptance of the suggested document merge resolution recommendation:

updating the collaborative document to incorporate the suggested document merge resolution recommendation creating an updated collaborative document;

storing the updated collaborative document in a document collaboration data repository associated with the document collaboration platform; and retraining the document merge model based on the confirmation signal comprising the acceptance of the suggested document merge resolution recommendation.

13. The computer-implemented method of claim 10, the method further comprising:

generating the one or more document merge resolutions associated with a second user profile passage associated with a second user profile, wherein the second user profile passage is a first portion of the two or more portions of textual content, wherein the one or more document merge resolutions associated with the second user profile passage is generated based on a first document conflict of the one or more document conflicts, and wherein the first document conflict is determined based on the second user profile passage and a first user profile passage associated with a first user profile identifier, and wherein the first user profile passage is a second portion of the two or more portions of textual content.

14. The computer-implemented method of claim 10, the method further comprising:

generating sequenced textual content based on the two or more user input step events, wherein the sequenced textual content can be associated with the two or more user profiles; and rendering, on one or more interactive user interfaces associated with the collaborative document, the sequenced textual content.

15. The computer-implemented method of claim 10, wherein the one or more document conflicts comprise at least one of a duplicate textual content conflict, a duplicate subject matter conflict, a document item sequencing conflict, or a document markup conflict.

16. The computer-implemented method of claim 10, wherein the one or more document merge resolutions comprise at least one of a textual content deletion resolution, a textual content merging resolution, a document item resequencing resolution, or a textual content markup resolution.

17. The computer-implemented method of claim 10, wherein the document merge model comprises a machine learning model configured based on an artificial neural network (ANN), a recurrent neural network (RNN), a convolutional neural network (CNN), or a natural language processing (NLP) model.

18. A non-transitory computer-readable storage medium for automatically generating adaptive digital content for a collaborative document, the non-transitory computer-readable storage medium including instructions that when executed by at least one processor, cause the at least one processor to:

receive multi-user input data associated with the collaborative document, wherein the multi-user input data is generated by two or more client computing devices associated with two or more user profiles supported by a document collaboration platform, wherein the multi-user input data embodies textual content simultaneously generated by the two or more client computing devices during a collaborative editing session, and wherein a common representation of sequenced textual content associated with the collaborative document is rendered in near real time on respective interactive user interfaces associated with the two or more client computing devices;

generate, via the document collaboration platform, two or more user input step events based on the multi-user input data, wherein each of the two or more user input step events are associated with a respective user profile of the two or more user profiles;

generate, based on the two or more user input step events, a document object representative of the collaborative document;

determine one or more document conflicts arising as the two or more client computing devices are simultaneously generating textual content for the collaborative document during the collaborative editing session, the one or more document conflicts associated with the collaborative document based on application of a document merge model to the document object, wherein (i) the one or more document conflicts are associated with two or more portions of textual content that are similar within the collaborative document, and (ii) the two or more portions of textual content were provided by two or more different user profiles of the two or more user profiles;

determine, based on one or more pieces of metadata associated with the document object and user profile metadata, a dominant user profile of the two or more different user profiles;

generate, based on the one or more document conflicts, one or more document merge resolutions, wherein the one or more document merge resolutions (i) are associated with a respective merge resolution confidence score, and (ii) are based at least in part on a portion of the multi-user input data associated with the dominant user profile; and in response to a determination that a merge resolution confidence score associated with a selected document merge resolution of the one or more document merge resolutions satisfies a predefined document merge resolution threshold:

update the collaborative document to incorporate the selected document merge resolution.

19. The non-transitory computer-readable storage medium of claim 18, wherein the instructions further cause the at least one processor to:

in response to a determination that the merge resolution confidence score associated with the selected document merge resolution of the one or more document merge resolutions does not satisfy the predefined document merge resolution threshold:

generate a suggested document merge resolution recommendation based on the selected document merge resolution; and display the suggested document merge resolution recommendation on an interactive user interface associated with a client computing device related to a dominant user, wherein the dominant user is associated with a user profile of the two or more user profiles, and wherein the dominant user is determined by the document merge model based on metadata associated with the collaborative document.

20. The non-transitory computer-readable storage medium of claim 19, wherein the instructions further cause the at least one processor to:

receive a confirmation signal associated with the suggested document merge resolution recommendation, wherein the confirmation signal is generated by the client computing device associated with the dominant user, and wherein the confirmation signal comprises an acceptance of the suggested document merge resolution recommendation or a rejection of the suggested document merge resolution recommendation; and in response to receiving a confirmation signal comprising the acceptance of the suggested document merge resolution recommendation:

update the collaborative document to incorporate the suggested document merge resolution recommendation creating an updated collaborative document;

store the updated collaborative document in a document collaboration data repository associated with the document collaboration platform; and retrain the document merge model based on the confirmation signal comprising the acceptance of the suggested document merge resolution recommendation.

* * * * *